United States Patent
Huff et al.

(10) Patent No.: US 12,511,362 B2
(45) Date of Patent: Dec. 30, 2025

(54) MULTI-MODAL VERIFICATION AND AUTHENTICATION SYSTEM AND METHODS

(71) Applicant: Jumio Corporation, Sunnyvale, CA (US)

(72) Inventors: Daryl Huff, Saratoga, CA (US);
Jeetendra Kaul, Los Gatos, CA (US);
Thomas Krump, Buchkirken (AT);
Attila Balogh, Vienna (AT); Alix Melchy, Montreal (CA); Stuart Wells, Saratoga, CA (US); Lukas Danzer-Stauffer, Maria Anzbach (AT)

(73) Assignee: Jumio Corporation, Sunnyvale, CA (US)

( * ) Notice: Subject to any disclaimer, the term of this patent is extended or adjusted under 35 U.S.C. 154(b) by 0 days.

(21) Appl. No.: 18/623,034

(22) Filed: Apr. 1, 2024

(65) Prior Publication Data
US 2025/0307365 A1    Oct. 2, 2025

(51) Int. Cl.
*G06F 21/00* (2013.01)
*G06F 21/32* (2013.01)
*G06F 21/62* (2013.01)

(52) U.S. Cl.
CPC .......... *G06F 21/32* (2013.01); *G06F 21/6245* (2013.01)

(58) Field of Classification Search
CPC .............................. G06F 21/32; G06F 21/6245
See application file for complete search history.

(56) References Cited

U.S. PATENT DOCUMENTS

| | | | |
|---|---|---|---|
| 2015/0033305 A1* | 1/2015 | Shear | G06F 21/6245 726/11 |
| 2015/0242605 A1* | 8/2015 | Du | G06F 21/32 726/7 |
| 2015/0379253 A1* | 12/2015 | Cook | G06F 21/32 726/19 |
| 2019/0130168 A1* | 5/2019 | Khitrov | G06N 3/045 |

(Continued)

FOREIGN PATENT DOCUMENTS

WO    WO2022112620 A2    6/2022

OTHER PUBLICATIONS

PCT International Search Report and Written Opinion; Application No. PCT/US25/20931 Jumio Corporation, International filing date of Mar. 21, 2025, date of mailing Jul. 29, 2025, 19 pages.
(Continued)

*Primary Examiner* — William A Corum, Jr.
(74) *Attorney, Agent, or Firm* — Patent Law Works LLP; Greg T. Sueoka

(57) ABSTRACT

A multi-modal verification and authentication system can be used for customer onboarding and repeat customer access/interactions. The multi-modal verification and authentication system provides very low friction, highly secure, verification and authentication system. The multi-modal verification and authentication system is scalable and adaptable to perform serval types of identity verification which results in a high degree of certainty and accuracy for identification and authorization. The multi-modal verification and authentication system includes a multi-modal biometric identifier, a multiple multi-modal liveness detector and a multi-modal anti-spoofing detector used in user registration authentication processes.

25 Claims, 16 Drawing Sheets

(56) References Cited

U.S. PATENT DOCUMENTS

| | | | | |
|---|---|---|---|---|
| 2019/0362130 A1* | 11/2019 | Othman | ................ | G06V 40/13 |
| 2020/0005019 A1* | 1/2020 | Liu | ........................ | G06F 21/32 |
| 2023/0177508 A1* | 6/2023 | Ram | ...................... | G06V 40/70 |
| | | | | 705/44 |
| 2024/0257559 A1* | 8/2024 | Van Iperen | ............ | G06V 40/45 |

OTHER PUBLICATIONS

Alquarni, Mohammed A., et al. "Identifying Smartphone Users Based on How They Interact with Their Phones—Human-Centric Computing and Information Sciences." SpringerOpen, Springer Berlin Heidelberg, Feb. 28, 2020, hcis-journal.springeropen.com/articles/10.1186/s13673-020-0212-7.

"Behavioral Biometrics: Types, Use Cases & Key Concepts." RecFaces, Jun. 13, 2023, recfaces.com/articles/what-are-behavioral-biometrics.

"Best Facial Recognition Companies in 2024." Global Cyber Security Network, May 17, 2024, globalcybersecuritynetwork.com/blog/best-facial-recognition-companies/.

"Combining User Behavioural Information at the Feature Level to Enhance Continuous Authentication Systems." Knowledge-Based Systems, Elsevier, Mar. 15, 2022, www.sciencedirect.com/science/article/pii/S0950705122002398.A.

Data behind Mobile Behavioural Biometrics—a Survey, ietresearch. onlinelibrary.wiley.com/doi/full/10.1049/iet-bmt.2018.5174.

"Detect and Recognize Faces and Facial Features with Luxand Facesdk." Luxand, www.luxand.com/facesdk/?utm_source=bing&utm_medium=cpc.

"Face Authentication—Definition, Faqs." Innovatrics, May 19, 2023, www.innovatrics.com/glossary/face-authentication/.

"Face Recognition for Developers." Luxand, Jul. 3, 2024, www.luxand.com/.

"Implicit Authentication Method for Smartphone Users Based on Rank Aggregation and Random Forest." Alexandria Engineering Journal, Elsevier, Sep. 11, 2020, www.sciencedirect.com/science/article/pii/S1110016820303902.

Jones, Caitlin. "The Top 6 Biometric Authentication Solutions." Expert Insights, Jun. 24, 2024, expertinsights.com/insights/the-top-biometric-authentication-solutions/.

Mole, Callum, et al. "Digital Identity Architectures: Comparing Goals and Vulnerabilities." arXiv.Org, Feb. 20, 2023, arxiv.org/abs/2302.09988.

PixLab | Symisc Systems. Copyright (C) All rights reserved. "Facial Authentication for the Web." FACEIO, Jul. 3, 2024, faceio.net/.

Scheffler, Christiane, et al. "The Association between Weight, Height, and Head Circumference Reconsidered." Nature News, Nature Publishing Group, Jan. 9, 2017, www.nature.com/articles/pr20173#:~:text=There%20is%20no%20doubt%20that%20under%20normal%20nutritional,the%20general%20proportionality%20in%20the%20human%20form%20%285%29.

"Workflows: Visual Workflow Builder to Automate Workplace Access Control." OLOID, May 17, 2024, www.oloid.ai/products/workflows/.

* cited by examiner

Multi-Modal Biometric Identifier 208

Face And Voice Detector And Iris And Sclera Detector 602

Face And Iris Detector And Face And Palm Detector 604

Face And Fingerprint Detector 606

Face And Signature Detector 608

Other Multi-Modal Biometric Detector 610

Multi-Modal Behavioral Biometric Detector 612

Correlation Detector 614

Figure 6

MULTI-MODAL VERIFICATION AND AUTHENTICATION SYSTEM AND METHODS

BACKGROUND

With the proliferation of social networking and other types of information sharing networks, photos of many individuals can be found online. By downloading images found online and using tools to modify those images, bad actors can generate any number of new images they use to try and impersonate or imitate the identity of the real or authentic users. In particular, fraudsters are trying to use images and other fake documentation to subvert mobile payment and verification methods presently available.

With the popularity of social networks and the Internet, there are millions of images of people that can readily be downloaded and copied. Additionally, there are many new types of artificial intelligence (AI) and machine learning (ML) technologies applied to almost every different type of business. With the increased popularity and proliferation of generative AI and ML tools, it has become extremely easy for unsophisticated users to generate a variety of new images from existing images to which they have access. These new images can be generated from any images that can be found on the Internet. Because there are so many new tools, it is difficult for existing authentication and fraud detection software to detect all these new variants. These new generative AI/ML techniques can also be used to produce a variety of other information that is currently used by conventional systems to detect identity theft or other anomalous conditions.

Considering the above, there is currently no comprehensive solution for determining and detecting instances where bad actors are trying to pass off computer-generated images and data as the authentic information of users.

SUMMARY

In general, an innovative aspect of the subject matter described in this disclosure may be implemented in methods that include receiving, using one or more processors, device information for a device associated with a user; receiving, using the one or more processors, physical biometric information of the user; receiving, using the one or more processors, behavioral biometric information of the user; performing, using the one or more processors, liveness analysis on the physical biometric information and the behavioral biometric information; determining whether the user is authentic based upon the liveness analysis; capturing, using the one or more processors, document information related a document of the user; performing, using the one or more processors, a liveness check on the document information; determining whether the document is authentic based upon the liveness check; and in response to determining that the user is authentic and the document is authentic, registering the user in an identity registry.

Another innovative aspect of the subject matter described in this disclosure may be implemented in methods that include receiving, using one or more processors, device information for a device associated with a user; receiving, using the one or more processors, physical biometric information of the user; receiving, using the one or more processors, behavioral biometric information of the user; performing, using the one or more processors, liveness analysis on the physical biometric information and the behavioral biometric information; determining whether the user is authentic based upon the liveness analysis; retrieving user information from an information assembly object; comparing the user information to the physical biometric information; determining whether the physical biometric information matches the user information from the information assembly object; and responsive to the physical biometric information matching the user information, approving the user as authentic.

In general, another aspect of the subject matter described in this disclosure includes a system comprising a registry having an input and an output coupled to receive and send information, the registry configured to store information to identity assembly objects and retrieve information from the identity assembly objects; a registration module having an input and an output coupled to receive information from the computing device and store information to the registry, the registration module creating a unique identity assembly object associated with a user and a computing device pair, the registration module coupled to receive and process information from the computing device, the input and the output of the registration module coupled to the computing device to receive physical biometric information, behavioral biometric information, and device information and to send a registration signal, the output of the registration module coupled for storing information to the unique identity assembly object; an authentication module having an input and an output coupled to receive information from the computing device, the authentication module determining whether the user associated with the computing device is an authenticated user, the authentication module coupled to receive information from the computing device and sending an authentication signal to the computing device, the authentication module coupled to retrieve information from the registry for comparison to the information received from the computing device; a multi-modal biometric identifier configured to process information and extract two types of biometric information, the multi-modal biometric identifier coupled to receive information from the computing device and coupled to provide the biometric information to the registration module and the authentication module; a multi-modal liveness detector configured to detect liveness, the multi-modal liveness detector coupled to receive information from the computing device, the multi-modal liveness detector coupled to provide a determination of liveness to the registration module and the authentication module; and a multi-modal anti-spoofing detector configured to detect a plurality of types of spoofing, the multi-modal anti-spoofing detector coupled to receive information from the computing device, the multi-modal anti-spoof in detector configured to provide a determination regarding spoofing to the authentication module and the registration module.

Other implementations of one or more of these aspects include corresponding systems, apparatus, and computer programs, configured to perform the actions of the methods, encoded on computer storage devices.

These and other implementations may each optionally include one or more of the following aspects. For instance, the method further comprises creating an identity assembly object including the device information, the physical biometric information, and the behavioral biometric information and storing the identity assembly object in a database that is the identity registry. In another instance, the method may specify that the physical biometric information is one or more from a first group of a face, a voice, an iris, a sclera, eye color, hair color, aging, a palm, a signature, a fingerprint, a finger length, left-handed or right-handed, a gender, ethnicity, and DNA parameters; and the behavioral biometric information is one or more from a second group of body movement, device-based gestures, a voice pattern, and other behavioral biometric information that can be derived from the device information. In another instance, the method may further include determining whether the physical biometric information satisfies a first quality threshold; determining whether the behavioral biometric information satisfies a second quality threshold; responsive to the physical biometric information not satisfying the first quality threshold, capturing additional biometric information; and responsive to the behavioral biometric information not satisfying the second quality threshold, capturing additional behavioral information. In another example, the method includes performing an anti-spoofing analysis on the physical biometric information and the behavioral biometric information; determining whether the user is authentic based upon the liveness analysis and the anti-spoofing analysis; and responsive to determining that the user is not authentic, rejecting registration of the user and the device. For instance, the aspects may also include capturing an image of the document related to identification of the user; determining whether the image of the document satisfies a threshold; and responsive to determining that the image of the document does not satisfy the threshold, capturing another physical document image or digital identification information. In another example, the aspects may further include responsive determining that the image of the document satisfies the threshold, performing a document liveness check on the image of the document; determining whether the document is authentic based upon the document liveness check; and responsive to determining that the document is not authentic, rejecting registration of the user and the device. In another example, the aspects may further include detecting an image injection attack from the physical biometric information and the behavioral biometric information of the user; detecting a device injection attack based on the device information of the user; and responsive to detecting the image injection attack or the device injection attack, rejecting registration of the user and the device. For instance, the aspects may also include detecting a device risk based on the device information of the user; and responsive to detecting the device risk, rejecting registration of the user and the device. For example, the aspects may further include querying a third party data base using the document information to retried queried data; comparing the queried third party data to the document information; determining whether the queried third party data matches the document information within a predefined threshold; and responsive to determining that the queried third party data does not matches the document information within the predefined threshold, rejecting registration of the user and the device. For instance, the aspects may also include performing file system authentication using the device information; determining whether the file system authentication satisfies a threshold; and responsive to the file system authentication not satisfying the threshold, rejecting registration of the user and the device. For instance, the aspects may also include detecting a re-registration condition; responsive to detecting re-registration, blocking any authorization approvals for the user; performing a re-registration process; determining whether an identity of the user is confirmed by the re-registration process; and responsive to determining the identity of the user is confirmed, allowing an authorization approval. In another instance, the method may specify that a re-registration condition includes one or more from a group of a change in the physical biometric information, the behavioral biometric information, or the device information; an identity being compromised; a presence of biometric information on a dark web; and a request for re-registration.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 6 is a block diagram showing a multi-modal biometric identifier in accordance with some implementations.

DETAILED DESCRIPTION

As set forth in detail below, the technology described herein provides an innovative approach for a multi-modal verification and authentication system 120. The multi-modal verification and authentication system 120 can be used for customer onboarding and repeat customer access/interactions. The multi-modal verification and authentication system 120 is particularly advantageous because it provides very low friction, highly secure, verification and authentication system. The multi-modal verification and authentication system 120 is particularly advantageous because it is scalable and adaptable to perform serval types of identity verification which results in a high degree of certainty and accuracy for identification and authorization. The multi-modal verification and authentication system 120 includes access to one or more data sources 122*a*-122*n* of identity assembly object information.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
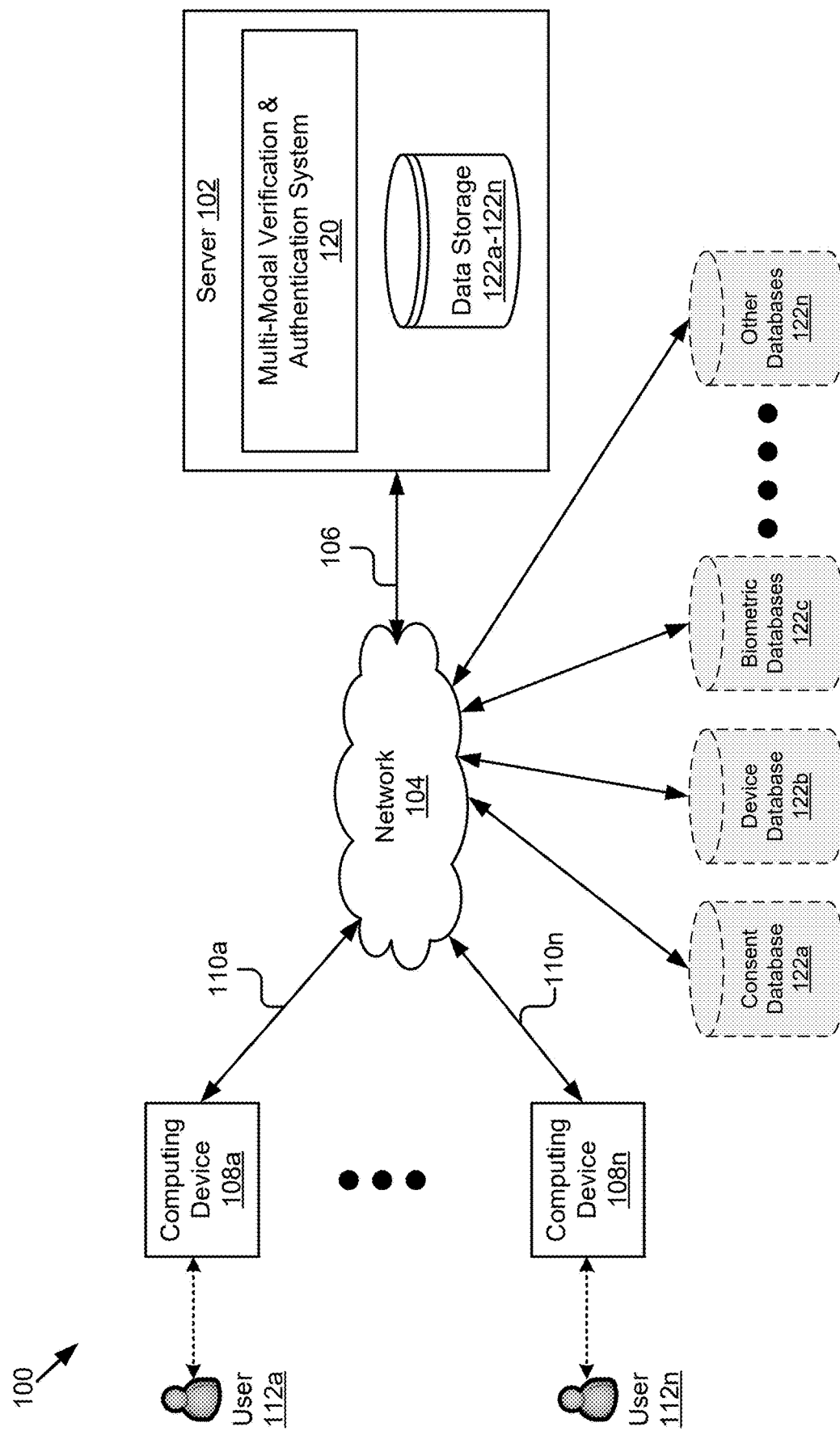
FIG. 1 is a high-level block diagram illustrating a system including a multi-modal verification and authentication system in accordance with some implementations.

FIG. 1 is a high-level block diagram illustrating an example system 100 including a multi-modal verification and authentication system 120 according to some implementations. The system 100 includes a server 102, a network 104, one or more computing devices 108a-108n, and one or more databases 122a-122n. While a particular arrangement is depicted in FIG. 1 by way of example, it should be noted that other system configurations are possible including other devices, systems, and networks as well as pluralities of any of the components shown in FIG. 1.

The network 104 may communicatively couple the various components of the system 100. In some implementations, the network 104 is a wired or wireless network, and may have numerous different configurations. Furthermore, the network 104 may include a local area network (LAN), a wide area network (WAN) (e.g., the internet), and/or other interconnected data paths across which multiple devices may communicate. In some implementations, the network 104 may be a peer-to-peer network. The network 104 may also be coupled with portions of a telecommunications network for sending data using a variety of different communication protocols. In some implementations, the network 104 may include Bluetooth (or Bluetooth low energy) communication networks or a cellular communications network for sending and receiving data including via short messaging service (SMS), multimedia messaging service (MMS), hypertext transfer protocol (HTTP), direct data connection, wireless access point (WAP), email, etc. Although the example of FIG. 1 illustrates one network 104, in practice one or more networks can connect the entities of the system 100.

The computing device 108 may include one or more computing devices having data processing and communication capabilities. The computing device 108 is coupled to communicate with other components of the system 100 via signal line 110 and network 104. For example, computing device 108a is coupled by signal line 110a to the network 104 for communication, cooperation, and interaction with the other components of the system 100. Similarly, computing device 108n is coupled by signal line 110n to the network 104. While the example of FIG. 1 depicts two computing devices 108a and 108n, the system 100 may include any number of computing devices 108. Although not shown, the computing device 108 may include a web browser, and/or other applications. The web browser and/or other applications provide functionality for a user using the computing device 108 to interact with the multi-modal verification and authentication system 120 that is configured as part of the server 102. The computing device 108 may be used by the user, an administrator, a data scientist, etc. to input information, receive status about information, or otherwise interact with the multi-modal verification and authentication system 120 as will be described below. According to the techniques introduced herein, the operation and interaction of the computing device 108 with the server 102, in particular, the multi-modal verification and authentication system 120 is described in more detail below with reference to the processes of FIGS. 10A-11C. In some implementations, the web browser of the computing device 108 may also be used to present user interfaces. In some implementations, the computing device 108 may be a mobile phone, a desktop computer, a laptop, a tablet, a workstation, or other similar computing device 108. The computing device 108 may include a processor, a communication unit, memory, one or more input devices, one or more output devices, a plurality of different types of sensors, and is capable of capturing both pictures and images of the user of the computing device 108. The plurality of different types of sensors may also collect information or be instructed to collect information about how the user 112 interacts with the computing device 108.

The server 102 has data processing and communication capabilities as will be described in more detail below with reference to FIGS. 2-9. The server 102 may be coupled to communicate with other components of the system 100 via signal line 106 and the network 104. In some implementations, the server 102 is a hardware server. In other implementations, the server 102 is a combination of a hardware server and a software server. In still other implementations, the server 102 is entirely a software server. The server 102 comprises a multi-modal verification and authentication system 120 and a data store 122 as are described in more detail below. Although not shown, the server 102 may be integrated into other larger systems responsible for security, authentication, verification, and authorization.

The data storage 122 will be described below in more detail with reference to FIG. 2. However, as shown in FIG. 1, the data storage 122a-122n may be part of the server 102. In some implementations, the data storage 122a-122n may be individual data stores each separately coupled to the network 104 to be accessed and used by the other components of the system 100. As shown in in FIG. 1, the first data storage 122a may be a consent database storing any data submitted by a user or other third party where they have signed a consent for the system to use the information in identify detection, a second data storage 122b may be a device database storing information about devices, a third data storage 122c may be a biometric database storing biometric information of users, and there may be other databases 122n with any types of other information that can be used for identity detection and authentication. The data storage 122a-122n are depicted with dashed lines indicating they are optional and not required for all implementations.

Figure 2:
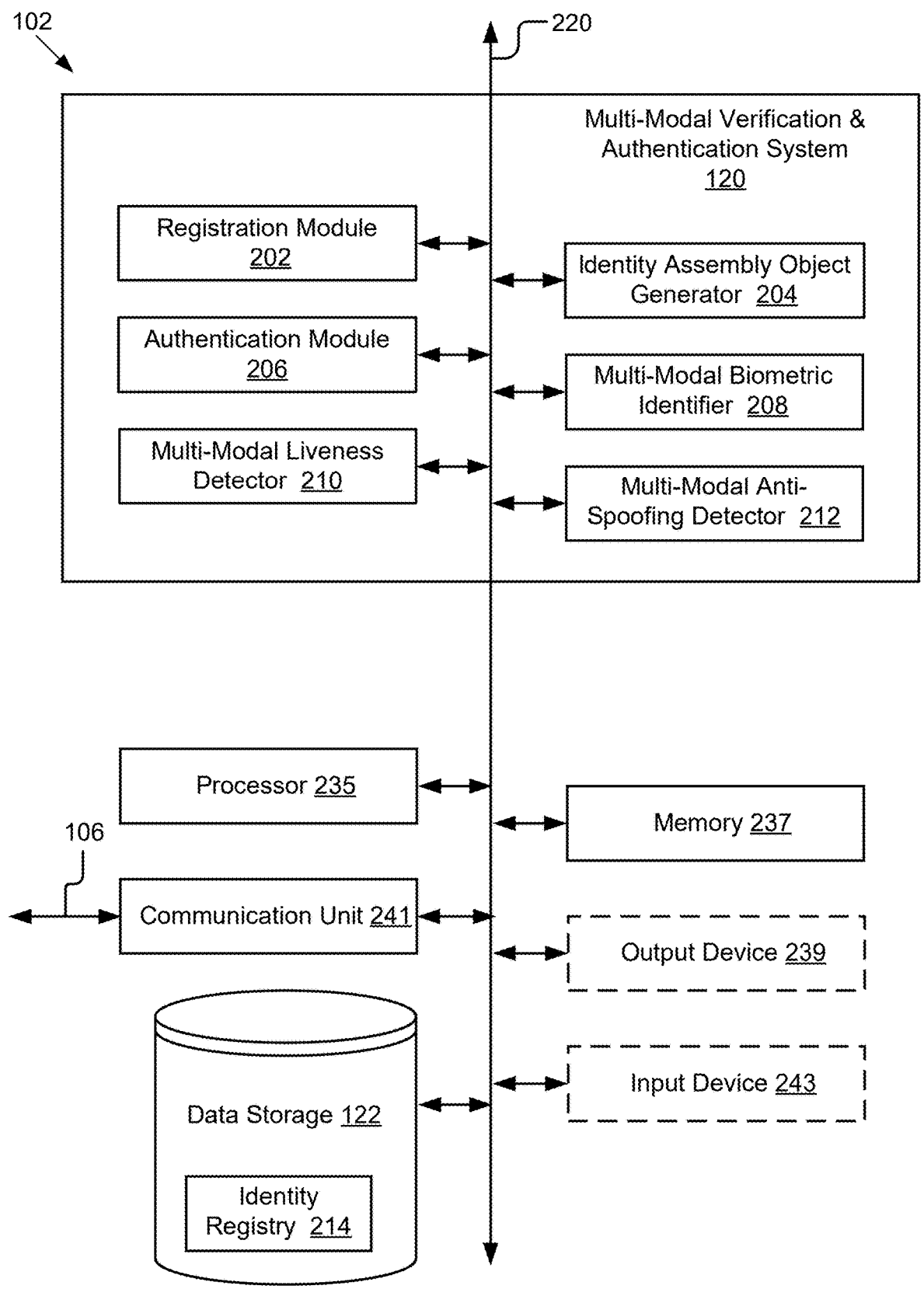
FIG. 2 is a block diagram illustrating a hardware server including the multi-modal verification and authentication system in accordance with some implementations.

Referring now to FIG. 2, one example of a server 102 including the multi-modal verification and authentication system 120 is shown. In some implementations, the server 102 comprises the multi-modal verification and authentication system 120, a processor 235, memory 237, a communication unit 241, the data storage 122, an output device 239, and an input device 243. The multi-modal verification and authentication system 120, the processor 235, memory 237, the communication unit 241, the data storage 122, the output device 239, and the input device 243 are communicatively coupled to each other for communication and cooperation by the bus 220. The server 102 depicted in FIG. 2 is provided by way of example and it should be understood that it may take other forms and include additional or fewer components without departing from the scope of the present disclosure. For instance, various components of the server 102 may be coupled for communication using a variety of communication protocols and/or technologies including, for instance, communication buses, software communication mechanisms, computer networks, etc. While not shown, the server 102 may include various operating systems, sensors, additional processors, and other physical configurations. The processor 235, memory 237, communication unit 241, etc., are representative of one or more of these components.

The data storage 122 can include one or more non-transitory computer-readable media for storing the data. In some implementations, the data storage 122 may be incorporated with the memory 237 or may be distinct therefrom.

In some implementations, the data storage 122 may include a database management system (DBMS). For example, the DBMS could include a structured query language (SQL) DBMS, a NoSQL DBMS, various combinations thereof, etc. In some implementations, the DBMS may store data in multi-dimensional tables comprised of rows and columns, and manipulate, e.g., insert, query, update and/or delete, rows of data using programmatic operations. While the data storage 122 is shown in FIGS. 1 and 2 as being part of the server 102, it should be understood that in some implementations the data storage 122 may be directly coupled to the network 104 and not included in the server 102. For example, as depicted in FIG. 1, one or more databases may be provided as data storage 122a-122n for a consent database 122a, a device database 122b, a biometric database 122c, or any other database 122n storing data needed by the multi-modal verification and authentication system 120. These databases directly coupled to the network 104 are depicted as optional since they are shown with dashed lines. The server 102 would access the data storage 122 via the network 104 in such an implementation. As shown in FIG. 2, the data storage 122 may include an identity registry 214. The identity registry 214 is a storage of the identity assembly object (IAO) 302 for each user that has been registered in the system 100. In some implementation the identity registry 214 provides each identity assembly object 302 with a unique identifier so that it can be searched and identified. In some implementations, the identity registry 214 is a table or database with every component of the identity assembly object as a column of the table. Some implementations of the IAO 302 are described in more detail with reference to FIG. 3.

The bus 220 can include a communication bus for transferring data between components of the server 102, a network bus system including the network 104 or portions thereof, a processor mesh, a combination thereof, etc. In some implementations, the various components of the server 102 cooperate and communicate via a communication mechanism included in or implemented in association with the bus 220. In some implementations, the bus 220 may be a software communication mechanism including and/or facilitating, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, communication between components of server 102 via bus 220 may be secure (e.g., SSH, HTTPS, etc.).

The processor 235 may execute software instructions by performing various input, logical, and/or mathematical operations. The processor 235 may have various computing architectures to process data signals (e.g., CISC, RISC, etc.). The processor 235 may be physical and/or virtual and may include a single core or plurality of processing units and/or cores. In some implementations, the processor 235 may be coupled to the memory 237 via the bus 220 to access data and instructions therefrom and store data therein. The bus 220 may couple the processor 235 to the other components of the server 102 including, for example, the multi-modal verification and authentication system 120, the communication unit 241, and the output device 239. The processor 235 is also coupled by the communication unit 241 to signal line 106 and the network 104 to retrieve and store information from the other components of the system 100.

The memory 237 may store and provide access to data to the other components of the server 102. The memory 237 may be included in a single computing device or a plurality of computing devices. In some implementations, the memory 237 may store instructions and/or data that may be executed by the processor 235. The memory 237 is also capable of storing other instructions and data, including, for example, an operating system, hardware drivers, other software applications, databases, etc. (not shown). The memory 237 may be coupled to the bus 220 for communication with the processor 235 and the other components of server 102. The memory 237 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor 235. In some implementations, the memory 237 may include one or more of volatile memory and non-volatile memory (e.g., RAM, ROM, flash memory, hard disk, optical disk, etc.). It should be understood that the memory 237 may be a single device or may include multiple types of devices and configurations.

The output device 239 may be any device capable of outputting information from the server 102. The output device 239 may include one or more of a display (LCD, OLED, etc.), a printer, a 3D printer, a haptic device, audio reproduction device, touch-screen display, a remote computing device, etc. In some implementations, the output device 239 is a display which may display electronic images and data output by a processor, such as processor 235 of the server 102 for presentation to a user. The output device 239 is shown with dashed lines in FIG. 2 to indicate that it is optional.

The communication unit 241 may include one or more interface devices (I/F) for wired and/or wireless connectivity among the components of the server 102 and the network 104. For instance, the communication unit 241 may include, but is not limited to, various types of known connectivity and interface options. The communication unit 241 may be coupled to the other components of the server 102 via the bus 220. The communication unit 241 can provide other connections to the network 104 via signal line 106 and to other systems, devices, and databases of the system 100 using various standard communication protocols.

The input device 243 may include any device for inputting information into the server 102. In some implementations, the input device 243 may include one or more peripheral devices. For example, the input device 243 may include a keyboard, a pointing device, microphone, an image/video capture device (e.g., camera), and a touchscreen display integrated with the output device 239, etc. The input device 243 is shown with dashed lines in FIG. 2 to indicate that it is optional.

As shown in FIG. 2, the multi-modal verification and authentication system 120 comprises a registration module 202, an identity assembly object generator 204, an authentication module 206, a multi-modal biometric identifier 208, a multi-modal liveness detector 210, and a multi-modal anti-spoofing detector 212. These modules, their configuration, structure, and functionality are described below in more detail collectively and individually with reference to FIGS. 3-9. In some implementations, the registration module 202, the identity assembly object generator 204, the authentication module 206, the multi-modal biometric identifier 208, the multi-modal liveness detector 210, and the multi-modal anti-spoofing detector 212 are sets of instructions stored in the memory 237 executable by the processor 235 to provide their respective acts and/or functionality. In any of these implementations, the registration module 202, the identity assembly object generator 204, the authentication module 206, the multi-modal biometric identifier 208, the multi-modal liveness detector 210, and the multi-modal anti-spoofing detector 212 may be adapted for cooperation and communication with each other, the processor 235 and other components of the server 102 by the bus 220. These components 202, 204, 206, 208, 210, and 212 are also coupled to the network 104 via the communication unit 241 for communication and interaction with the other systems, devices, and databases of the system 100.

The registration module 202 may be steps, processes, functionalities, software executable by a processor, or a device including routines for registering a user 112 in the multi-modal verification and authentication system 120. The registration process may include cooperation with the identity assembly object generator 204 to create a unique identity assembly object (IAO) 302 associated with the user 112. Each user 112 will have a single unique identity assembly object 302. In some implementations, once the IAO 302 is created, it is stored in the identity registry 214 of the data storage 122. The registration module 202 is coupled by the bus 220 to the other components of the multi-modal verification and authentication system 120 as well as the other components of the system 100. The registration module 202 interacts with those other components as will be described in more detail below with reference to FIGS. 10A and 10B. For example, the registration module 202 is coupled to receive signals from the computing devices 108 of the individual users 112 to receive physical biometric information, behavioral biometric information, device information, and document information for a physical document or a digital document. The registration module 202 may also be coupled to other third-party systems or databases to retrieve and/or receive other information that will become part of the IAO 302 or used in the registration process. This information may include physical biometric information, behavioral biometric information, document information (physical or digital), device information, or signals from third-party systems validating information or indicating a fraudulent data or compromise data. As will be described in more detail with reference to FIG. 4, the registration module 202 is coupled to the multi-modal biometric identifier 208, the multi-modal liveness detector 210, and the multi-modal anti-spoofing detector 212 to provide input to them and receive processing results from them.

The identity assembly object generator 204 may be steps, processes, functionalities, software executable by a processor, or a device including routines to generate an IAO 302. The identity assembly object generator 204 is coupled by the bus 220 for cooperation and interaction with the registration module 202 and the authentication module 206. In response to requests from the registration module 202 the identity assembly object generator 204 creates new instances of IAOs 302 and adds data and information to the IAO 302. In response to requests from the authentication module 206, the identity assembly object generator 208 updates information in the IAOs 302 based upon information from the authentication module 206 or provides information to the authentication module 206. The identity assembly object generator 204 is coupled to receive input signals from the registration module 202 to create new records in the data storage 122, in particular the identity registry 214, corresponding to a new IAO 302. In some implementations, the identity assembly object generator 204 is also coupled to the other modules 206, 208, 210, and 212, and responsive to signals from them, modifies, updates, or deletes information from an IAO 302. In some implementations, the identity assembly object generator 204 is also configured to receive new identity data about a user 112 and update the IAO 302 for the user 112. For example, the identity assembly object generator 204 may be coupled to receive signals from the authentication module 206 and update the IAO 302 of the particular user 112 based on information that has been gathered about the user 112 during the authentication process.

The authentication module 206 may be steps, processes, functionalities, software executable by a processor, or a device including routines to authenticate the user 112, or information received from the computing device 108 about a user 112. The authentication module 206 is coupled by the bus 220 to the other components of the multi-modal verification and authentication system 120 and the other components of the system 100. The authentication module 206 receives information from the computing device 108 of the user 112 and processes that information to determine if the user 112 is the person they are presenting themselves as. For example, the authentication module 206 implements an authentication process described in more detail below with reference to FIG. 11A to 11C. In some implementations, the authentication module 206 accesses the identity registry 214 to retrieve information from the IAO 302 of the user 112 and compare it to the information received from the computing device 108. In some implementations, the authentication module 206 also stores information it collects during an authentication process to the IAO 302 of the user 112, if authenticated. In some implementations, the communication and transfer of data between the authentication module 206 and the identity registry 214 having the IAOs 302 is via the identity assembly object generator 204. As will be described in more detail with reference to FIG. 5, the authentication module 206 is coupled to the multi-modal biometric identifier 208, the multi-modal liveness detector 210, and the multi-modal anti-spoofing detector 212 to provide input to them and receive processing results from them.

The multi-modal biometric identifier 208 may be steps, processes, functionalities, software executable by a processor, or a device including routines for processing information received and extracting identifying information. In some implementations, the multi-modal biometric identifier 208 receives and processes physical biometric information and/or behavioral biometric information. The multi-modal biometric identifier 208 is coupled to cooperate and interact with the registration module 202 and/or the authentication module 206. The multi-modal biometric identifier 208 receives information from these modules 202, 206 during the registration process or the authentication process respectively, and processes that information to detect whether the information corresponds to a user 112. The multi-modal biometric identifier 208 advantageously uses two or more parameters to perform identification. For example, the multi-modal biometric identifier 208 may use both physical biometric parameters and behavioral biometric parameters for identification of the user 112. Examples of these parameters are described in more detail below with reference to the IAO 302 and FIG. 3. In some implementations, the multi-modal biometric identifier 208 may include one or more detectors that each identify a plurality of parameters. One example of the multi-modal biometric identifier 208 is described in more detail below with reference to FIG. 6.

The multi-modal liveness detector 210 may be steps, processes, functionalities, software executable by a processor, or a device including routines configured to determine liveness of the subject or user 112 based on input information. The multi-modal liveness detector 210 is coupled to receive information about the subject or user 112 from the registration module 202 or the authentication module 206. The multi-modal liveness detector 210 analyzes the information received and generates signals indicating whether the information is a biometric sample of a live human being or a fake representation. The multi-modal liveness detector 210 responds to input from the registration module 202 or the authentication module 206 with signals indicating a live human being or fake representation. In some implementations, the multi-modal liveness detector 210 performs two or more types of liveness detection. The multi-modal liveness detector 210 is also coupled to the identity registry 214 to access information about users 112, e.g., a given IAO 302. In most instances, the liveness determination can be done using a methods, for example, Eye or Face Motion analysis, without information from the IAO 302, but in some instances the multi-modal liveness detector 210 compares the information from the identity registry 214 to the information received from the registration module 202 or the authentication module 206 to make its determination about liveness. An example implementation of the multi-modal liveness detector 210 will be described below in more detail with reference to FIG. 7.

The multi-modal anti-spoofing detector 212 may be steps, processes, functionalities, software executable by a processor, or a device including routines to detect spoofing attempts. The multi-modal anti-spoofing detector 212 detects various identity fraud or impersonation attacks where an entity masquerades as someone else or assumes a false identity to deceive or manipulate others. The multi-modal anti-spoofing detector 212 is coupled to receive information about the subject or user 112 from the registration module 202 or the authentication module 206. The multi-modal anti-spoofing detector 212 analyzes the information received and generates signals indicating whether the information represents the actual user 112 or is a spoofing attempt. The multi-modal anti-spoofing detector 212 responds to input from the registration module 202 or the authentication module 206 with signals indicating an actual user 112 or is a spoofing attempt. In some implementations, the multi-modal anti-spoofing detector 212 performs two or more types of spoof detection. In limited cases, the multi-modal anti-spoofing detector 212 is also coupled to the identity registry 214 to access information about users 112, e.g., a given IAO 302, new types of anti-spoofing algorithm that may utilize stored face biometric in the identity registry 214. In most cases, the multi-modal anti-spoofing detector 212 information received from the registration module 202 or the authentication module 206 to make its determination about spoofing. An example implementation of the multi-modal anti-spoofing detector 212 will be described below in more detail with reference to FIG. 8.

Figure 3:
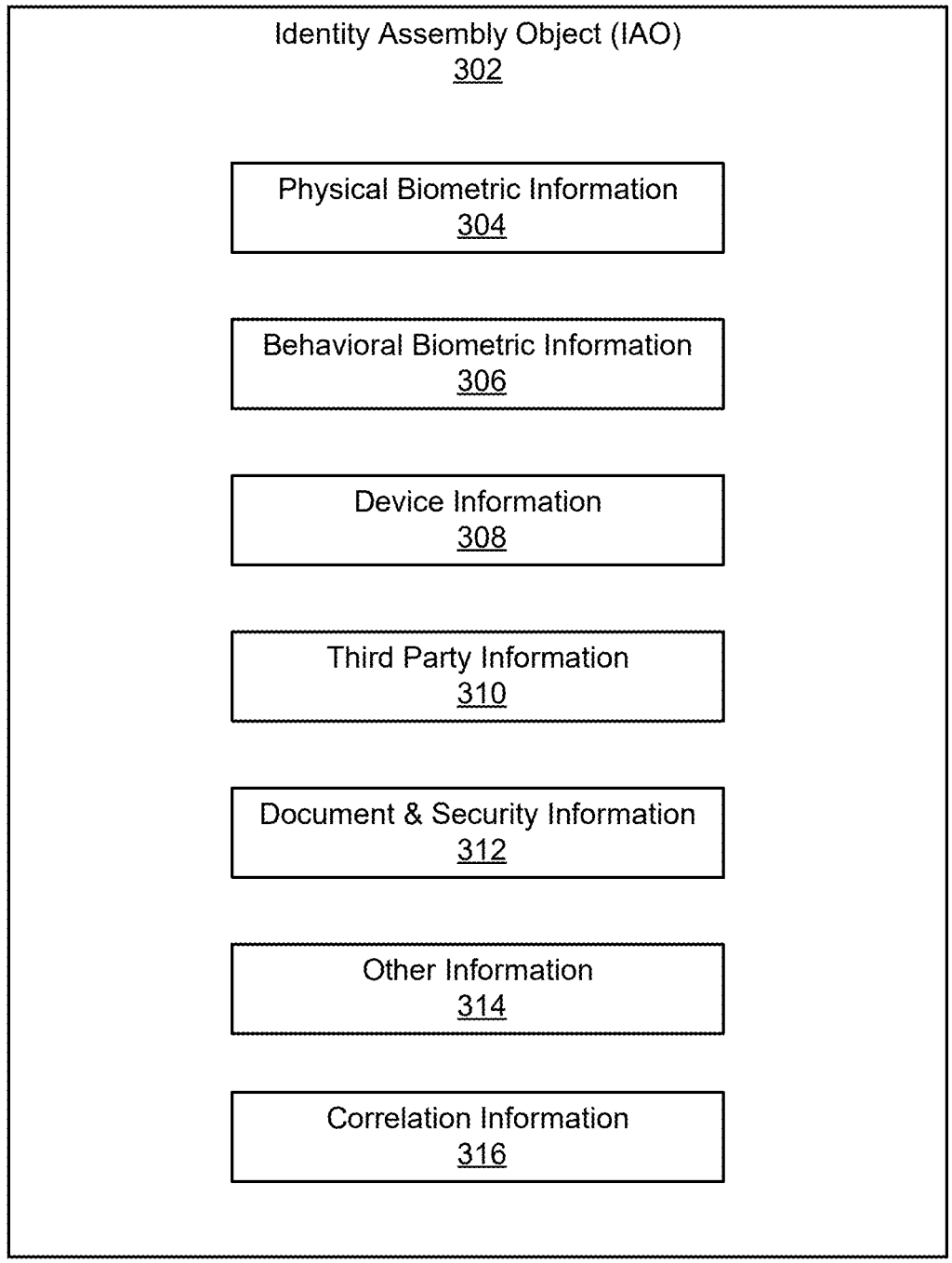
FIG. 3 is a block diagram showing an identity assembly object in accordance with some implementations.

Referring now to FIG. 3, an example implementation of the identity assembly object (IAO) 302 is shown. Although only a single IAO is shown in FIG. 3, it should be understood that the identity registry 214 may store millions of IAOs 302, at least one IAO 302 for each unique user 112. The changes in data over time for a user 112 may also be stored in the single IAO 302 for each user, for example, in different fields or records of the IAO 302. As illustrated, each IAO 302 comprises a plurality of data sets or data records. The plurality of data sets or records are advantageously grouped by type. The IAO 302 includes one or more physical biometric information records 304, behavioral biometric information records 306, device information records 308, third-party information records 310, document and security information records 312, other information records 314, or correlation information records 316. The IAO 302 is advantageously a unique object that provides a central repository of information known about the user 112 that has been verified by a registration process, authentication process, manual examination process, or third-party process. The IAO 302 is also advantageous because it is a list of relevant biometric, device, environmental, document and third-party elements which are assembled and used to uniquely verify a user, register them in the system 100 and used as a reusable identity for subsequent authentication repeated sessions. The IAO 302 may include "Direct" and "Derived" checks that are an extensive set of checks constructed at "verification and registration" time and used in the authentication process as will be described below, and for the most part invisible to the user 112 during authentication. Third party information may be retrieved at authentication time depending on customer use case and added to the IAO 302. The IAO 302, as described herein, is generated by the identity assembly object generator 204 and the data in them modified, updated, edited, or deleted by the other components of the multi-modal verification and authentication system 120. The IAO 302 is particularly advantageous because, as will be described below, additional records can be added to the IAO 302 for new information types and parameters because as human identity changes with time and circumstances, the IAO 302 and the system 100 are able to change and adapt to meet new and future authentication challenges.

The physical biometric information records 304 store one or more physical biometric direct parameters including, but are not limited to, the face, the voice, the iris, the sclera, eye color, hair color, aging, the palm, the signature, the fingerprint, the finger length, left-handed or right-handed, the gender, ethnicity, DNA parameters, etc. These direct parameters can be used by the other components of the multi-modal verification and authentication system 120 for performing face match (selfie to selfie, selfie to document), retina/iris match, sclera match, voice match, eye color match (selfie to selfie, selfie to document), hair color match (selfie to selfie, selfie to document), head shape match (selfie to selfie, selfie to document), etc. In some implementations, the physical biometric information records 304 may also store derived parameters, including but not limited to, age estimation, gender estimation, etc. For example, it should be understood that when the raw data representing the physical biometric direct parameters cannot be stored, the physical biometric information records 304 may include various types of representations of the physical biometric direct parameters.

The behavioral biometric information records 306 store one or more behavioral parameters including, but are not limited to, body movement, device-based gestures, voice patterns, and other behavioral information. In some implementations, body movement may include posture, gait, handling, device position or movement or gyro sensors, individual body part position and movement, or any other user behavior that can be derived from the device information including but not limited to, one more gyro sensors, accelerometers, magnetometers, device conditions, device components used or state, etc. In some implementations, device-based gestures may include mouse or scrolling activity, keystroke movement, touchscreen behaviors and locations, mobile device interactions, navigation patterns, swiping speed, device holding behavior, device position/movement/gyro-sensors. Similar to physical biometric information records 304, the behavioral biometric information records 306 may include both directly recorded parameters or measured parameters as well as derived parameters.

It should be understood that when the raw data representing the directly recorded behavioral biometric parameters cannot be stored, the behavioral biometric information records 306 may include various types of representations of the behavioral biometric parameters derived or calculated.

The device information records 308 store one or more device or environmental parameters including, but not limited to, device type, device version (e.g., iPhone 13), device identification numbers (e.g., ESN), device fingerprints, geolocation, operating system and version, connection information or node, location (e.g., GPS, Wi-Fi, cell tower, Bluetooth, other, etc.) installed fonts, call data, text data, memory usage, canvas fingerprinting, screen resolution, color depth, browser type and version, browser plug-ins, application usage, language preference, time zone, network provider, usage patterns, accelerometer information, sensor information (e.g. geomagnetic field sensor, temperature sensor, etc. Again, the device information records 308 may include both measured parameters as well as derived parameters. It should be understood that this information will change every authentication session but not necessarily by much and the differential in these parameters provides excellent validation or fraud signals to the system 100. In some implementations, the device information records 308 may include records indicating whether the device of the user 112 has been jail broken (e.g., modified to remove restrictions imposed by the manufacturer or operator to allow the installation of unauthorized software.) or has or is operable in developer mode which is an indication of higher level of risk, and may be factored into other detection and evaluation, e.g., AFS scoring. It should also be noted that the multi-modal verification and authentication system 120 assumes an explicit association between a specific device and a user. Devices to be used during authentication must be used during registration/verification and re-registration. If a user 112 wishes to use a new device or change devices, they will be encouraged/mandated to go through a device Onboarding session as will be described in more detail below with reference to FIGS. 12A and 12B. In some implementations, the multi-modal verification and authentication system 120 includes a series of user behavioral models created based on the various parameters to detect outlier behavior and identity fraud.

The third-party information records 310 store one or more parameters related to third parties or retrieved from third parties. In some implementations, the third-party information records 310 store code or procedures that are automatically executed when the records 310 are accessed to retrieve information from the third parties. For example, this code or procedures may automatically access the third-party servers or computer systems and retrieve information corresponding to the third-party information records 310. The third-party information records 310 may include information that has been retrieved from third parties, for example, documents, images, or other information. The third parties may include government agencies at a country, state, region, city, or other government level, title companies and organizations, organizations that register things (e.g., real estate, vehicles, etc.), organizations that store bibliographical information (name, street, address, age, etc.), credit reporting agencies and economic projection agencies, organizations that store identifier's for citizens (Social Security, Medicare, driver's licenses, government identification, etc.), organizations that store medical record information, organizations that provide identity specific documentation, organizations that provide educational history, organizations that store family relationships, social network organizations, financial institutions, online application providers, organizations to provide email addresses and reputation, telephony companies that provide mobile phone numbers and reputation, etc. It should be understood that in some instances, the third-party information records may be information retrieved about potentially fraudulent activity or identity theft, for example links to information of the user 112 found in the dark web. The third-party information may also be instances when third-party agencies have detected specific instances of identity theft of the user's information. As noted above, the information from the third parties may be retrieved and stored in the third-party information records 310. In such an instance, the parameters are considered directly measured parameters. However, it should be understood that in some implementations, the information from third parties may be further processed by the multi-modal verification and authentication system 120 to generate third-party derived information which may also be stored in the third-party information records 310.

The document and security information records 312 store one or more parameters related to documents or security. For documents, the document and security information records 312 may store any information related to documents whether original raw data form or derived form. For example, the document security information records 312 may include: 1) raw images of physical identification documents submitted during registration, authentication, or at any other times; 2) digital identification information submitted during registration, authentication, or at any other times; 3) images of physical identification documents or other verification information or mechanisms retrieved from original documents sources (e.g. government agency databases like the division of motor vehicles), 4) digital identification information or other verification information or mechanisms retrieved from the original documents sources, or 5) security features of physical documents or digital documents. For security information, the one or more parameters may be related document elements, document identifiers, document utilities, user personal identification numbers, encryption keys, passwords, tokens, site addresses, secondary authentication, etc. Again, the security information records 308 may include both measured parameters as well as derived parameters.

The other information records 314 store one or more parameters related to miscellaneous information. For example, the other information records 316 may store authentication history, registration history, or other information usable by the multi-modal verification and authentication system 120. Another example of other information records 314 may include the depth of the images captured by a mobile phone, estimated differences in biometrics (e.g., severe aging . . . no aging.), etc.

The correlation information records 316 store one or more parameters related to relationships between or correlations between any data in the information records 304, 306, 308, 310, 312, and 314 described above. It should be understood that the correlation information parameters may describe any relationship between one of the types of information 304, 306, 308, 310, 312, and 314 described above and another of the types of information 304, 306, 308, 310, 312, and 314. For example, one parameter may describe the correlation between device information 308 and physical biometric information 304. In another example, a parameter may describe the correlation between physical biometric information 304 and behavioral biometric information 306. Moreover, the correlation information records 316 may store information about a correlation between two different portions of same information type for any one or more of the types. For example, a correlation information record 316 may store a relationship between a fingerprint and an eye color. It should be understood that other correlation parameters may provide multiple correlations between a plurality of different types of information described above 304, 306, 308, 310, 312, and 314. For example, two, three, or in different types of information they have one or more correlations between them. One specific example of a measurable correlated signal is when a user 112 at registration takes their cell phone and takes a selfie (physical biometric information) of themselves. The taking of a facial image and the movement of the hand and arm (behavioral biometric information) are correlated in that single action. In another example, the correlation between an IMU (inertial measurement unit) and video-based motion vectors are compared to determine if the camera or video feed are hijacked. It should be understood that a variety other device information (device ID, communication type, cell tower, etc.), behavioral biometric information, and physical biometric information may have a variety of unique correlations between these types of information that can be collected and recorded in the correlation information record 316. This information can later be used to determine whether another individual trying to authenticate themselves has the same correlation information. If the correlation information does not match, authentication can be rejected.

Figure 4:
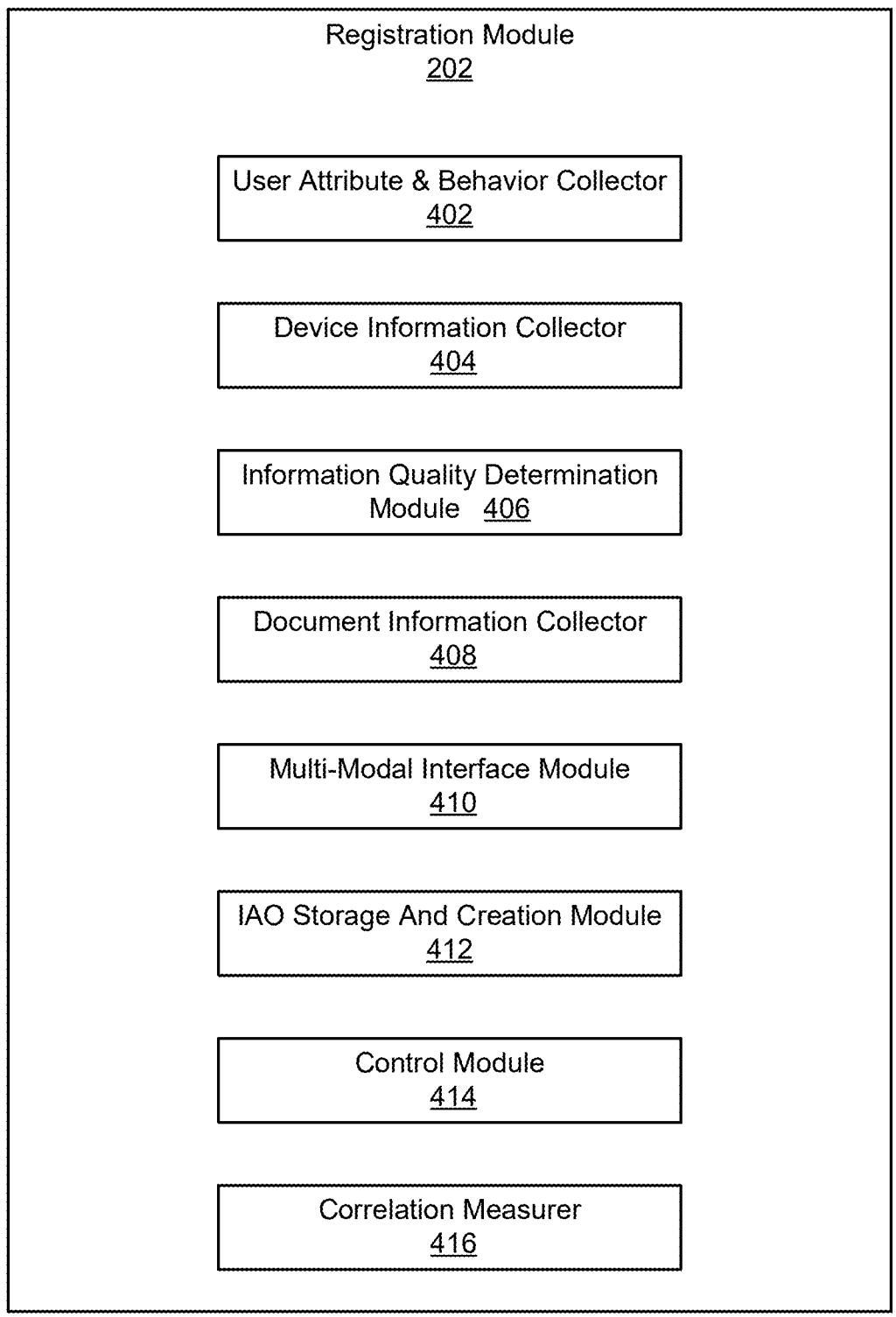
FIG. 4 is a block diagram illustrating an example of a registration module in accordance with some implementations.

Referring now to FIG. 4 an example implementation of the registration module 202 is shown. The general structure and operation of the registration module 202 has been described above with reference to FIG. 2. As shown in FIG. 4, the registration module 202 comprises a user attribute and behavior collector 402, a device information collector 404, an information quality determination module 406, a document information collector 408, a multi-modal interface module 410, an IAO storage and creation module 412, a control module 414, and a correlation measure 416. As has been noted above, these components 402, 404, 406, 408, 410, 412, 414, and 416 are coupled for communication and cooperation with the other components 204, 206, 208, 210 and 212 of the multi-modal verification and authentication system 120 as well as the computing devices 108 to collect and capture information for storage in the IAO 302 of the user 112.

The user attribute and behavior collector 402 may be steps, processes, functionalities, software executable by a processor, or a device including routines configured to collect user attribute and behavior information during a registration or re-registration process. In particular, the user attribute and behavior collector 402 includes routines that cause the multi-modal verification authentication system 120 to cooperate with the computing device 108 of the user 112. The user attribute behavior collector 402 generates signals to present instructions to cause the user 112 to perform various actions with the computing device 108 to collect different types of physical biometric information 304 and behavioral biometric information 306 as has been described above. For example, the user attribute and behavior collector 402 may cause the user to capture an image (e.g., selfie) of herself, a video of herself, or any other biometric input (e.g., a fingerprint scan) that the computing device 108 is capable of capturing. This could also be any one of the different types of physical biometric information that have been described above. The user attribute and behavior collector 402 also sends instructions and cooperates with the computing device 108 to capture any number of different types of behavioral biometric information 306. For example, this may be presenting instructions on the display of the computing device 108 to perform particular actions, and recording the inputs, states, or other information of the computing device 108 as these behaviors are performed. These behaviors could be any of the behavioral biometric information 306 described above with reference to the identity assembly object 302 including movements of the computing device 108, gestures input to the computing device 108, voice input to the computing device 108, etc. In some implementations, all possible biometrics are extracted including voice and by definition the synchronization parameters associated with voice, lips, and face movement (jaw and ear lobe). These biometrics can later be used for verification and injection attack defense (Deepfake, Face Morph, etc.). Moreover, for higher security use cases additional capture capabilities may be required to support human retina capture. In some implementations, behavioral biometrics associated with user-initiated movements and touches on the device are also recorded for subsequent matching during the authentication process. In still other implementations, biometrics/DNA parameters are extracted and estimated (face, voice, age, gender, ethnicity, etc.) from the Selfie session and these are later compared with supporting information on accompanying government or/and state ID documents and/or ID parameters obtained from third-party sources. The user attribute and behavior collector 402 is also coupled to the IAO storage and creation module 412 to send the raw information received from the computing device 108 for storage in and creation of an IAO 302, and to cooperate with the identity assembly object generator 208 to process the raw information sent to create derivative parameters for storage in and IAO 302. The user attribute behavior collector 402 is also coupled to the information quality determination module 406 so that any physical biometric information or behavioral biometric information can be reviewed for quality. It should be understood that there may be some instances where raw physical biometric information or behavior biometric information may not be secured from the computing device 108 or the device information for the computing device 108. In some cases, different representations of the data are provided by the computing device 108 or stored in the computing device 108 as device information. In such cases, the user attribute and behavior collector 402 may collect those representations of the physical biometric information, behavior biometric information, or device information and store the representations in the IAO 302 corresponding to the user 112 and computing device 108 pair. For example, for fingerprints, most computing devices 108 provide no way to export the fingerprint from a device. Usually, the fingerprint will be represented as hashed value and can be exported as this representation from the computing devices 108 and stored in the IAO 302. Similar representations can be retrieved from computing devices 108 and stored in the IAO 302 for any physical biometric information, behavior biometric information, or device information where the raw information cannot be retrieved.

The device information collector 404 may be steps, processes, functionalities, software executable by a processor, or a device including routines configured to collect device information 308 during a registration or re-registration process. The device information collector 404 is configured for communication and cooperation with the computing device 108 of the user 112. The device information collector 404 retrieves any device information from the computing device 108 of the user 112 and stores it in an IAO 302 corresponding to the user 112. In some implementations, the device information collector 404 cooperates with the IAO storage and creation module 412 to store and process device information that it receives from the computing device 108 into the IAO 302 corresponding to the user 112. The information collected from the computing device 108 may be raw data or parameters that the device information collector 404 receives directly, or it may be derivative parameters which the device information collector 404 processes alone or in combination with the IAO storage and creation module 412 or the identity assembly object generator 204. The device information collector 408 is also coupled to provide device information to the information quality determination module 406 to determine whether it satisfies quality threshold for registration before it is stored in the IAO 302.

The information quality determination module 406 may be steps, processes, functionalities, software executable by a processor, or a device including routines configured to determine the quality of any input information received from other components of the registration module 202 and determine whether they satisfy a quality threshold. The information quality determination module 406 is coupled to receive physical biometric information 304 and behavioral biometric information 306 from the user attribute and behavior collector 402, to receive device information 308 from the device information collector 404, and to receive document information from the document information collector 408. The information quality determination module 406 may also be coupled to receive third-party information from the multi-modal interface module 410. In some implementations, the information from any collector 402, 404, 408, 410 may be stored in the IAO 302 and then later processed by the information quality determination module 406, and once processed by the information quality determination module 406 a flag or field can be set in the IAO 302 indicating whether the information stored satisfies the quality threshold measured by the information quality determination module 406. It should be understood that the information quality determination module 406 may have different quality thresholds for different types of information. For example, the information quality determination module 406 may have one quality threshold for a selfie image whereas it may have a different more difficult to satisfy threshold for a captured image of an eye, a sclera, a fingerprint, a retina, etc. Similarly, there may be other different thresholds for video, audio, and any other information collected by a collector during the registration or re-registration process. The information quality determination module 406 is coupled to provide its quality determination back to the respective collector 402, 404, 408 or 410 so that the quality determination can be used to collect additional data to satisfy the threshold. If the quality falls below a certain threshold the document or selfie image can be rejected, and the user asked to improve the quality by various means depending on what is causing quality levels to be low.

The document information collector 408 may be steps, processes, functionalities, software executable by a processor, or a device including routines configured to collect document information from different sources. In some implementations, the document information collector 408 communicates and cooperates with the computing device 108 to collect images of documents captured by the user 112. In some implementations, document information collector 408 cooperates with third-party systems to collect one or more images of documents or information contained in documents. The document information collector 408 may also use near field communication to interface and collect information about a document. Similar to the other collectors 402, 404, and 410 of the registration module 202, the document information collector 408 cooperates with the IAO storage and creation module 412 to create a new IAO 302 or add information to an existing IAO 302. In some implementations, the documentation information collector 408 is coupled to provide information that it has collected to the information quality determination module 406 to determine whether it satisfies a quality threshold before storing the information in an IAO 302 of the user 112.

The multi-modal interface module 410 may be steps, processes, functionalities, software executable by a processor, or a device including routines configured to interface with other third-party systems (e.g., databases 122a-122n) to retrieve information useful in the registration process. The multi-modal interface module 410 also allows the registration module 202 to cooperate with the other components of the multi-modal verification and authentication system 120 to perform liveness and spoofing and other checks on information that the registration module 202 captures. In some implementations, the multi-modal interface module 410 is capable of retrieving third-party information 310, document and security information 312, and other information 314 from other systems. The multi-modal interface module 404 is coupled to provide the information to the information quality determination module 406 if a quality check is to be performed on the incoming information. The multi-model interface module 410 is also coupled to provide information to the IAO storage and creation module 412 to add the information it collected to a corresponding IAO 302.

The IAO storage and creation module 412 may be steps, processes, functionalities, software executable by a processor, or a device including routines configured to perform registration of a computing device 108 and user 112 pair in the multi-modal verification and authentication system 120. The IAO storage and creation module 412 cooperates with the identity assembly object generator 204 to create an IAO 302 unique to the user 112 in the identity registry 214. The IAO storage and creation module 410 cooperates with other components 402, 404, 406, 408, and 410 to collect information and verify it is of a satisfactory quality and then creates a new IAO 302 for the user 112. In some implementations, IAO storage and creation module 412 processes the information it receives and confirms that there is a sufficient amount of data to create a registration record. Once a registration record is created, a corresponding IAO 302 is created in the identity registry 214, and the new IAO 302 and the identity registry 214 can be used to authenticate the user 112. In some implementations, the IAO storage and creation module 412 may perform a partial registration by creating a temporary IAO 302 if the amount of data collected by the other components of the registration module 202 does not meet the minimum data requirements necessary for registration. In such a case, the multi-modal verification and authentication system 120 flags the registration module 202 to solicit the missing necessary information from the user 112 and the corresponding computing device 108. If the missing information is not provided by the user 112 via their corresponding computing device 108 within a predetermined amount of time, the IAO storage and creation module 412 deletes the temporary IAO 302.

The control module 414 may be steps, processes, functionalities, software executable by a processor, or a device including routines configured to control the interaction and operation of the components 402, 404, 406, 408, 410, and 412 of the registration module 202 with other components of the system 100. In some implementations, the control module 414 executes the method 1000, 1200 described below with reference to FIGS. 10A-10B and 12A-12B and modifications to them. For example, the control module 414 may perform comparisons and analysis, and other processing to make the determinations in the method 1000, 1200 as illustrated in FIGS. 10A-10B and 12A-12B.

The correlation measurer 416 may be steps, processes, functionalities, software executable by a processor, or a device including routines configured to measure and record correlations between different types or portions of information as they are collected during the registration process. The correlation measurer 416 is coupled to the other components of the 402, 404, 406, 408, 410, 412, and 414 of the registration module 202 to monitor and record relationships between information as they are collected from the computing device 108 of the user 112. The correlation measurer 416 is also coupled to store information that it collects to the correlation information records 316 of the IAO 302. The correlation measurer and the information stored in the correlation information records 316 a particular advantageous because they make it nearly impossible for fraudulent actors to copy correlations between multiple types of information that are captured during the registration or authentication process.

Figure 5:
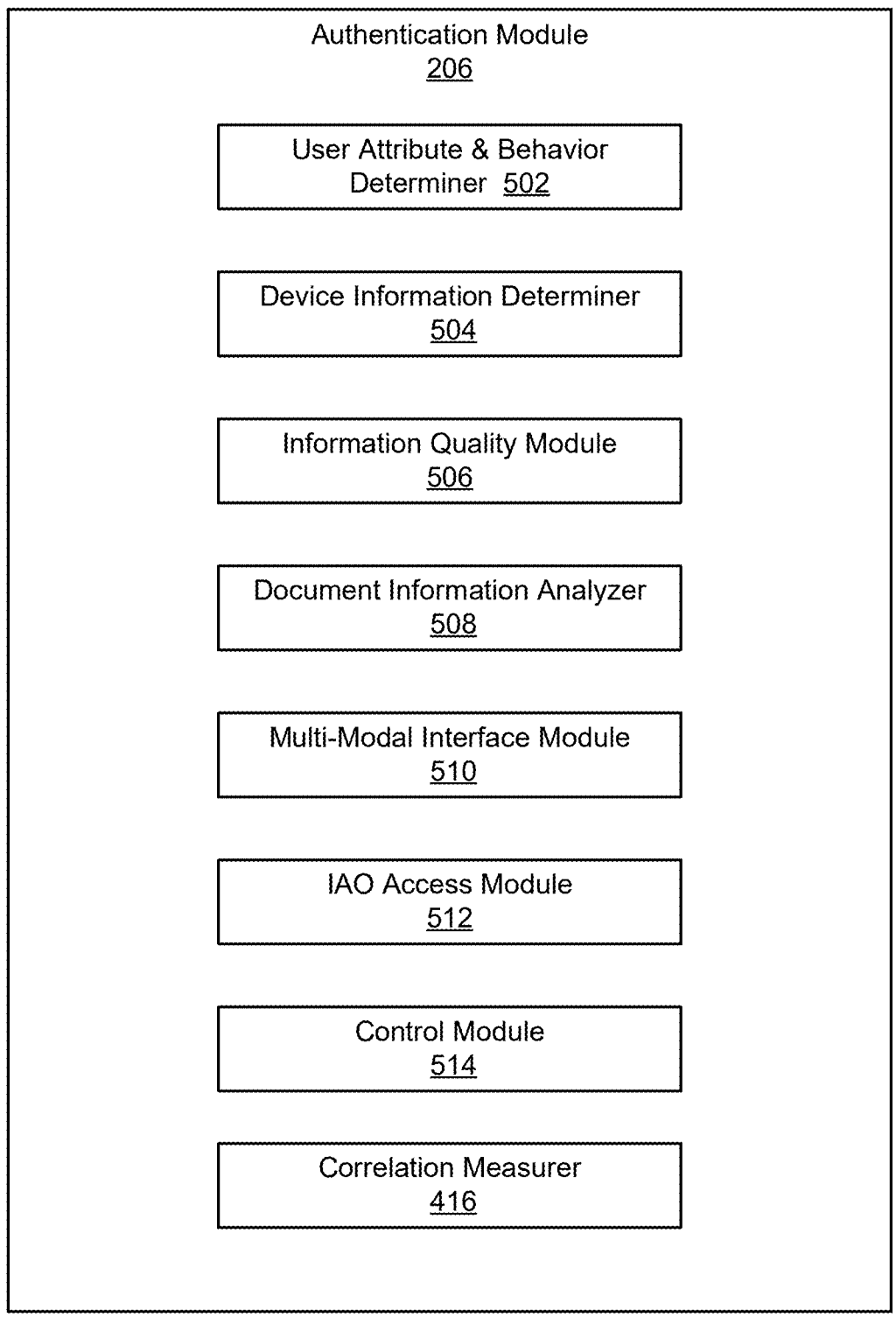
FIG. 5 is a block diagram illustrating an authentication module in accordance with some implementations.

Referring now to FIG. 5, an implementation of the authentication module 206 is shown. The authentication module 206 comprises a user attribute and behavior determiner 502, a device information determiner 504, an information quality module 506, a document information analyzer 508, a multi-modal interface module 510, an IAO access module 512, a control module 514, and a correlation measurer 416. These components 502, 504, 506, 508, 510, 512, 514, and 416 are configured and coupled for communication and interaction with each other to perform the functions described below. These components 502, 504, 506, 508, 510, 512, 514, and 416 are configured and coupled for communication and interaction with the other components of the multi-modal verification and authentication system 120 and the other components of the system 100, in particular, the computing devices 108 of the users. The correlation measurer 416 provides the same functionality and operation as has been described above with reference to the registration module 204, however, it performs these functions and operations during the authentication process. In particular, the correlation measurer 416 can measure the same or similar correlations and compare them to the correlations that were recorded during the registration process. Since it is very difficult for fraudsters to know and correlate which different types of information were used during registration, the correlation measurer 416 greatly enhances the security of the system 100 and the ability to detect fraudulent actors.

The user attribute and behavior determiner 502 may be steps, processes, functionalities, software executable by a processor, or a device including routines configured to cooperate with the computing device 108 and the user 112. The user attribute and behavior determiner 502 sends signals to the computing device 108 for it to present a variety of instructions of actions for the user 112 to perform. The user attribute and behavior determiner 502 also receives physical biometric information 304 and behavioral biometric information 306 from the computing device 108 in response to the user 112 performing the instructed actions. The user attribute and behavior determiner 502 cooperates with the computing device 108 to capture any desired physical biometric information 304 and behavioral biometric information 306 from the user 112. The user attribute and behavior determiner 502 is also coupled to send the information it receives to the control module 514 for additional processing. For example, in some implementations, the control module 514 compares the physical biometric information 304 or the behavioral biometric information 306 from the user attribute and behavior determiner 502 to physical biometric information 304 or behavioral biometric information 306 for the same user from the IAO access module 512. In this manner, the control module 514 is able to determine whether any portions of the information are the same as the information stored for the user 112 in the IAO 302 or different and to what extent. Based on the similarities or differences, the control module 514 may determine to authenticate or reject authentication of the user 112 and computing device 108 pair or may require a full or limited re-registration.

The device information determiner 504 may be steps, processes, functionalities, software executable by a processor, or a device including routines configured to retrieve device information 308 from the computing device 108 of the user 112. The device information determiner 504 can retrieve any amount of device information 308 from the computing device 108 and provide it to the control module 514. The control module 514 uses the information from the device information determiner 504 to determine whether the user 112 associated with the computing device 108 is authentic. By comparing the received device information 308 received by the device information determiner 504 to device information 308 stored in the IAO 302 corresponding to the user 112 and computing device 108 pair, the control module 514 determines whether the user 112 is authentic.

The information quality module 506 may be steps, processes, functionalities, software executable by a processor, or a device including routines configured to determine whether any information that it receives satisfies a quality threshold required for the control module 514 to do a comparison between the received information and the information stored in the IAO 302. The information quality module 506 is coupled to receive information from the user attribute and behavior determiner 502, the device information determiner 504, the document information analyzer 508, and the multi-modal interface module 510. The information quality module 506 analyzes the received information and determines whether it is of sufficient quality for the control module 514 to perform a comparison operation to approve or deny authentication based upon the comparison of the received information with the information in the IAO 302. If the quality of the information received does not satisfy the threshold, the information quality module 506 signals the corresponding other components 502, 504, 508, or 510 to acquire additional information, reacquire the original information, or perform a follow-up action to ensure that the information satisfies the quality threshold. The information quality module 506 is also coupled to the control module 514 to signal whether the quality of the information should be sufficient for the control module 514 to carry out the comparison required for authentication.

The document information analyzer 508 may be steps, processes, functionalities, software executable by a processor, or a device including routines configured to collect or secure third-party information 310, document and security information 312, or other information 314. For example, the document information analyzer 508 can cooperate with the computing device 108 to collect an image of a user's driver's license. The document information analyzer 508 can also cooperate with a third-party government server to retrieve the same image of the user's driver's license. Similarly, the document information analyzer 508 can cooperate with other devices and systems to retrieve third-party information 310, document and security information 312, or other information 314. In some implementations, the document information analyzer 508 can perform some of the functions that have been described above as being performed by the control module 514, in particular, comparison of received information to corresponding information stored in the IAO 302. The document information analyzer 508 is coupled to the control module 514 to receive control signals and send results to the control module 514. The control module 514 uses the information it receives from the document information analyzer 508 for comparison to corresponding information in an IAO 302 corresponding to the user 112 computing device 108 pair.

The multi-modal interface module 510 may be steps, processes, functionalities, software executable by a processor, or a device including routines configured to access the identity assembly object generator 204, the multi-modal liveness detector 210 and the multi-modal anti-spoofing detector 212. Responsive to signals from the control module 514, the multi-modal interface module 510 prepares and sends information for processing to the identity assembly object generator 204, the multi-modal liveness detector 210, or the multi-modal anti-spoofing detector 212. The multi-modal interface module 510 receives the results of processing of the data provided by the identity assembly object generator 204, the multi-modal liveness detector 210, or the multi-modal anti-spoofing detector 212, and provides that information to the control module 514 making decisions regarding authorization.

The IAO access module 512 may be steps, processes, functionalities, software executable by a processor, or a device including routines configured to for accessing IAOs 302 stored in the identity registry 214. In some implementations, the IAO access module 510 cooperates with the identity assembly object generator 202 to access to the identity registry 214. In other implementations, the IAO access module 512 searches and accesses IAOs 302 stored in the identity registry 214 directly. The IAO access module 512 is coupled to the control module 514 to receive search criteria (e.g., a minimal amount of identifying information about the computing device 108 and the user 112) to enable the IAO access module 512 to identify a unique IAO 302 corresponding to the user 112 and computing device 108 pair. The IAO access module 512 is coupled to receive requests from the control module 514 and provide an IAO 302 responsive to a request.

Figure 11A:
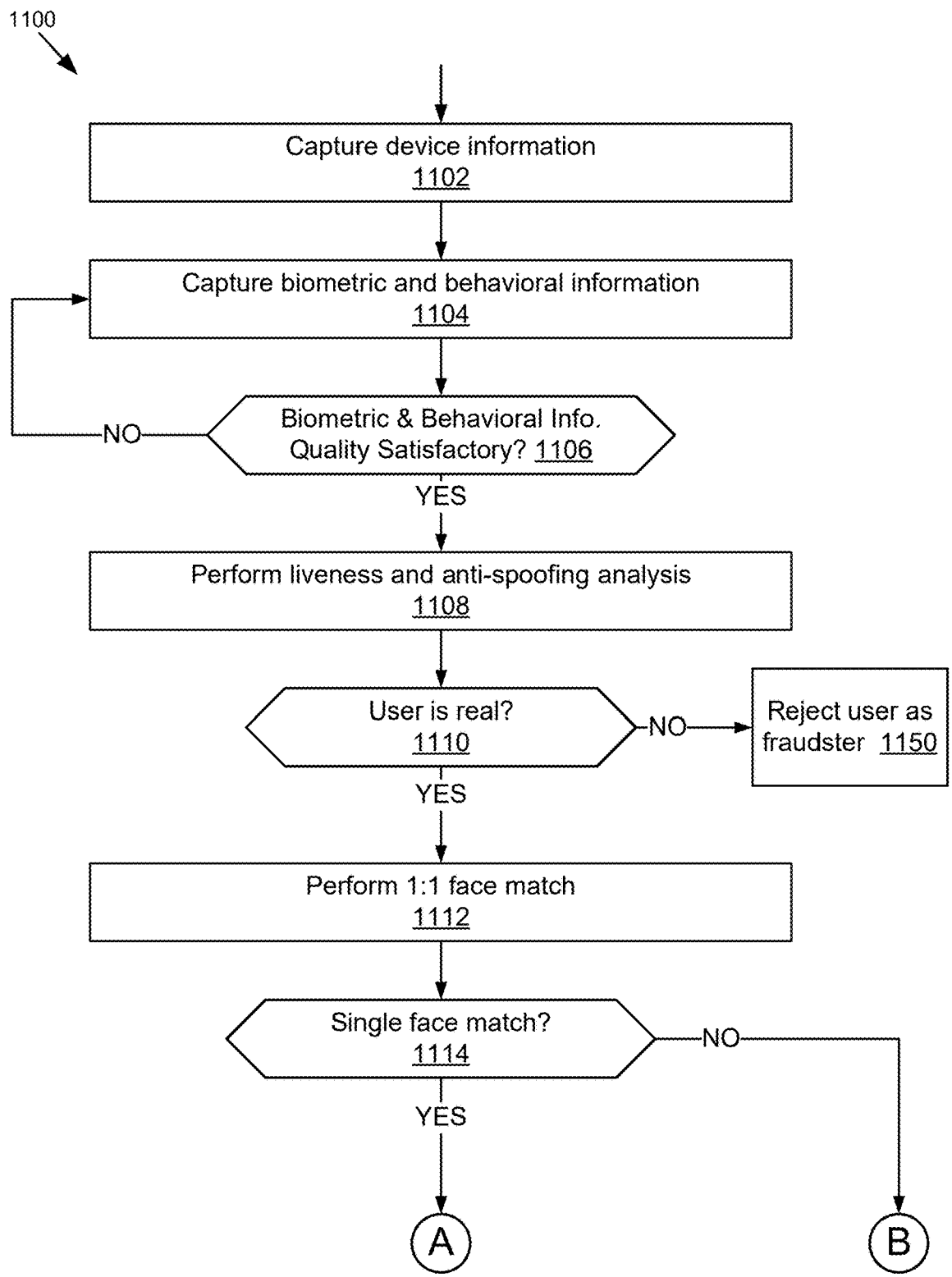
FIGS. 11A to 11C are a flow diagram showing a method for authenticating a user in the multi-modal verification and authentication system in accordance with some implementations.
Figure 11B:
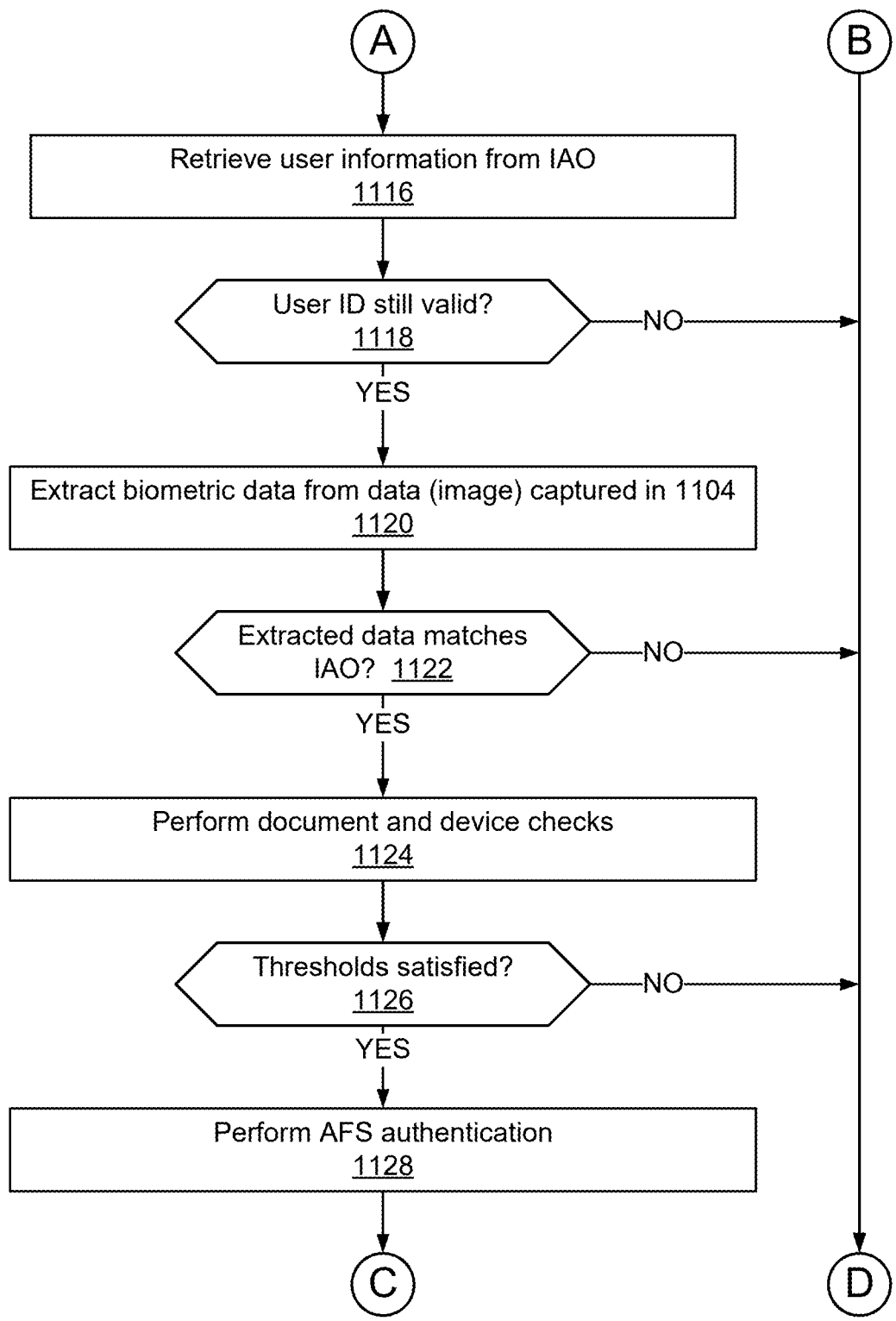
Figure 11C:
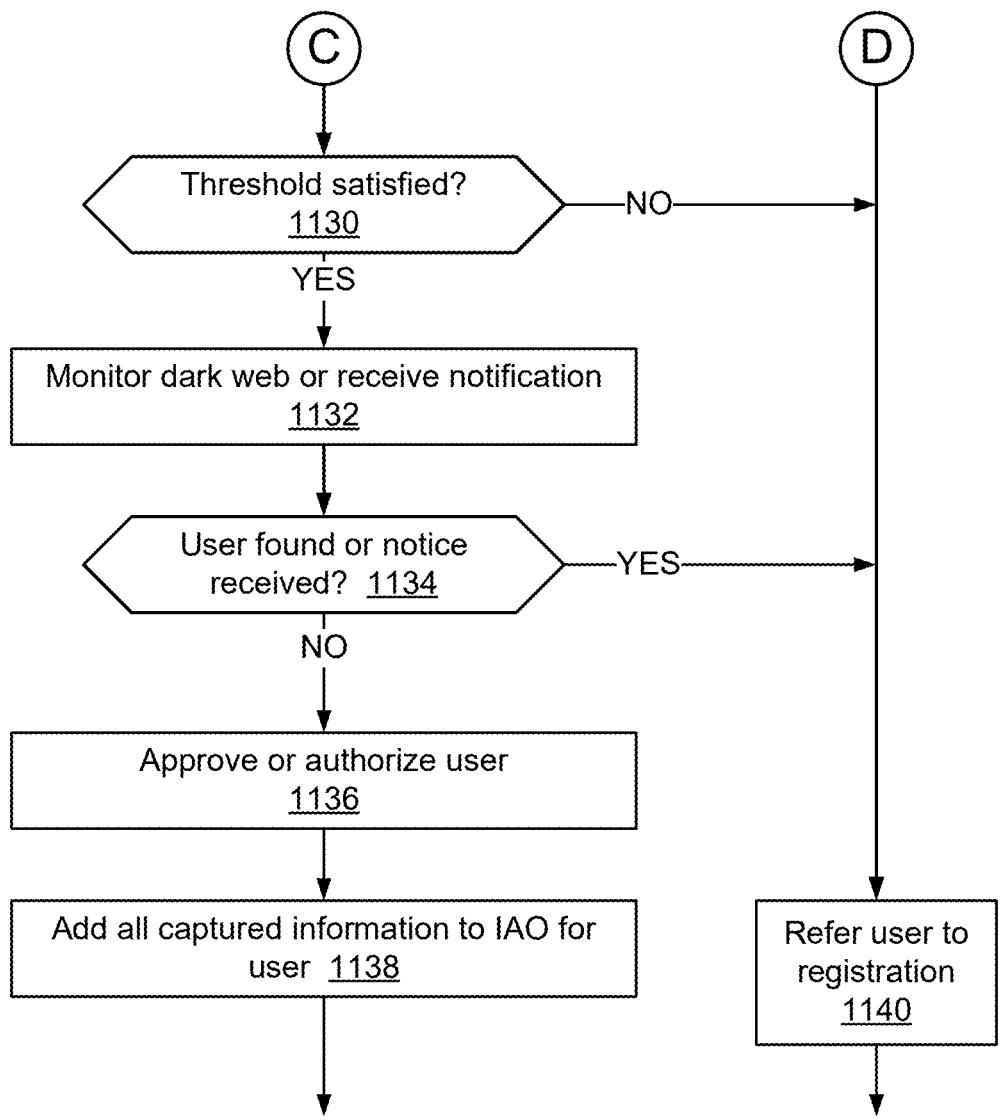

The control module 514 may be steps, processes, functionalities, software executable by a processor, or a device including routines configured to control the interaction of the components 502, 504, 506, 508, 510, and 512 of the authentication module 206 with other components of the system 100 and the multi-modal verification and authentication system 120. In some implementations, the control module 514 executes the method 1100 described below with reference to FIGS. 11A-11C, and modifications to it. For example, the control module 514 may perform comparisons, analysis, and other processing to make the determinations in the method 1100 as illustrated in FIGS. 11A-11C.

Referring now to FIG. 6, an example multi-modal biometric identifier 208 according to some implementations is shown. The multi-modal biometric identifier 208 comprises a face and voice detector and an iris and sclera detector 602, a face and Iris detector and a face and palm detector 604, a face and fingerprint detector 606, a face and signature detector 608, one or more other multi-modal physical biometric detectors 610, one or more multi-modal behavioral biometric detectors 612, and a correlation detector 614. FIG. 6 is used to illustrate how the multi-modal biometric identifier 208 is scalable in a number of different dimensions. The multi-modal biometric identifier 208 is scalable in a first dimension because each of the components 602, 604, 606, 608, 610, 612, and 614 are multi-modal in that each comprise two or more detectors for detecting different physical biometric conditions, behavioral biometric conditions, or correlations. The multi-modal biometric identifier 208 is also scalable in a second dimension in that any number of additional multi-modal physical biometric detectors 610, multi-modal behavioral biometric detectors 612, or correlation detectors 614 may be added to the multi-modal biometric identifier 208. For example, as future combinations of different biometric traits are determined to be dispositive in the authentication process, the multi-modal biometric identifier 208 may be modified to include any number of additional other multi-model biometric detectors even though only one other multi-modal biometric detector 610 is depicted in FIG. 6. The present disclosure can combine two different biometric characteristics into a new multi-modal biometric detector and add that new biometric detector to the multi-modal-mobile biometric identifier 208. Therefore, it should be understood that the multi-model biometric identifier 208 while illustrated in FIG. 6 as having five multi-modal biometric detectors may have any number of multi-modal biometric detectors greater than two in other implementations. The architecture of the multi-modal biometric identifier 208 is particularly advantageous because it ensures the highest level of identity matching while also providing the greatest level of security against traditional presentations, injection, and other forms of attacks. The multi-modal biometric identifier 208 uses two or more biometric parameters (physical and behavioral) to produce much higher levels of identification accuracy but also provides greater resiliency under less than favorable conditions due to poor quality during the authentication session.

The face and voice detector and iris and sclera detector 602 may be steps, processes, functionalities, software executable by a processor, or a device including routines configured to detect both a face and voice combination and an iris and sclera combination. The face and voice detector and iris and sclera detector 602 is coupled to the user attribute and behavior collector 402 of the registration module 202 or the user attribute and behavior determiner 502 of the authentication module 206 to receive physical biometric information 304. In particular, the face and voice detector and iris and sclera detector 602 advantageously processes face, voice, iris, and sclera information in particular combinations such that it is able to detect identity matches with a greater degree of certainty. It should be understood that in some implementations, there are two or more detectors, and any combination of physical biometric attributes may be detected and compared to the values recorded by the multi-modal verification and authentication system 120 during registration for a match. For example, important information such as heart rate may be monitored and stored heart rate on the computing device 108. This information can be used by such detectors and can be utilized in the AFS score. The face and voice detector and iris and sclera detector 602 provides its authentication information back to the registration module 202 or the authentication module 206 so that a registration may be rejected, or authentication may be denied, respectively.

The face and iris detector and face and palm detector 604 may be steps, processes, functionalities, software executable by a processor, or a device including routines configured to detect both a face and iris combination and a face and palm combination. The face and iris detector and face and palm detector 604 is coupled to the user attribute and behavior collector 402 of the registration module 202 or the user attribute and behavior determiner 502 of the authentication module 206 to receive physical biometric information 304. The face and iris detector and face and palm detector 604 processes the face, palm, and iris information in the combinations identified two more specifically detect matches during registration or authentication for greater accuracy. During registration, the face and iris detector and face and palm detector 604 provides its determination of a satisfactory match to the registration module 202. In response to the match being satisfactory, the registration is accepted, and registration module 202 causes the information (or a representation of it) received from the user attribute and behavior collector 402 to be stored in the IAO 302 of the user 112. If the match is not satisfactory, the registration is rejected. During authentication, the face and iris detector and face and palm detector 604 also provides its determination of a satisfactory match to the authentication module 206. Similarly, if the response to the match being satisfactory, the authentication is approved and accepted, and if the match is not satisfactory, the authentication is denied.

The face and fingerprint detector 606 may be steps, processes, functionalities, software executable by a processor, or a device including routines configured to detect both face information and fingerprint information. The face and fingerprint detector 606 is coupled to receive physical biometric information 304 from the user attribute and behavior collector 402 of the registration module 202 or the user attribute and behavior determiner 502 of the authentication module 206. The face and fingerprint detector 606 processes the face image the users fingerprint in combination thereby increasing the difficulty for a fraudulent actor to be able to produce the combination of information sufficient to be registered or authenticated.

The face and signature detector 608 may be steps, processes, functionalities, software executable by a processor, or a device including routines configured to detect both the face and the signature of user 112. The face and signature detector 608 is another example where the combination of physical biometric information 304 is difficult for bad actors to obtain. The face and signature detector 608 is coupled to receive physical biometric information 304 from the user attribute and behavior collector 402 of the registration module 202 or the user attribute and behavior determiner 502 of the authentication module 206. The output of the face and signature detector 608 is provided back to the registration module 202 or the authentication module 206 for allowing registration or authentication, respectively.

The other multi-modal physical biometric detector 610 may be steps, processes, functionalities, software executable by a processor, or a device including routines configured to detect any combination of two or more physical biometric parameters. In some alternate implementations, the other multi-modal physical biometric detector 610 detects a combination of a physical biometric parameter and a behavioral parameter. Based upon the parameter being detected, multi-modal physical biometric detector 610 may be coupled to the user attribute and behavior collector 402 of the registration module 202 or the user attribute and behavior determiner 502 of the authentication module 206. The multi-modal biometric detector 610 provides its results analysis back to the registration module 202 or the authentication module 206 for use in determining whether to allow registration or authorization.

The one or more multi-modal behavioral biometric detectors 612 may be steps, processes, functionalities, software executable by a processor, or a device including routines configured to detect any combination of two or more behavioral biometric parameters. For example, the multi-modal behavioral biometric detectors 612 may detect any two or more types or portions of the behavioral biometric information 306 described above with reference to FIG. 302. In some alternate implementations, the multi-modal behavioral biometric detector 612 detects a combination of a physical biometric parameter and a behavioral biometric parameter. Based upon the parameter being detected, the multi-modal behavioral biometric detector 612 may be coupled to the user attribute and behavior collector 402 of the registration module 202 or the user attribute and behavior determiner 502 of the authentication module 206. The multi-modal behavioral biometric detector 612 provides its results analysis back to the registration module 202 or the authentication module 206 for use in determining whether to allow registration or authorization.

The correlation detector 614 may be steps, processes, functionalities, software executable by a processor, or a device including routines configured to detect any correlations between any of the information types described above with reference to the IAO 302 of FIG. 3. For example, the correlation detector 614 may detect, determine, and record any relationships between the physical biometric information 304, the behavioral biometric information 306, and the device information 308 as the user 112 moves the computing device 108 to various positions to capture images of portions of the body, face, eyes etc. at different levels of focus and zoom which should generate different input signals as well as different device signals, all three of which are correlated by the correlation detector 614. In other implementations, the correlation detector 614 may determine and record various other correlations between any different numbers of information types described above with reference to the IAO 302 of FIG. 3. The correlation detector 614 is coupled to the computing device 10 to receive this information and to the identity registry 214 to retrieve correlation information 316 for comparison. The output of the correlation detector 614 is provided to the registration module 202 or the authentication module 206 for use in determining whether to allow registration or authorization, respectively.

Figure 7:
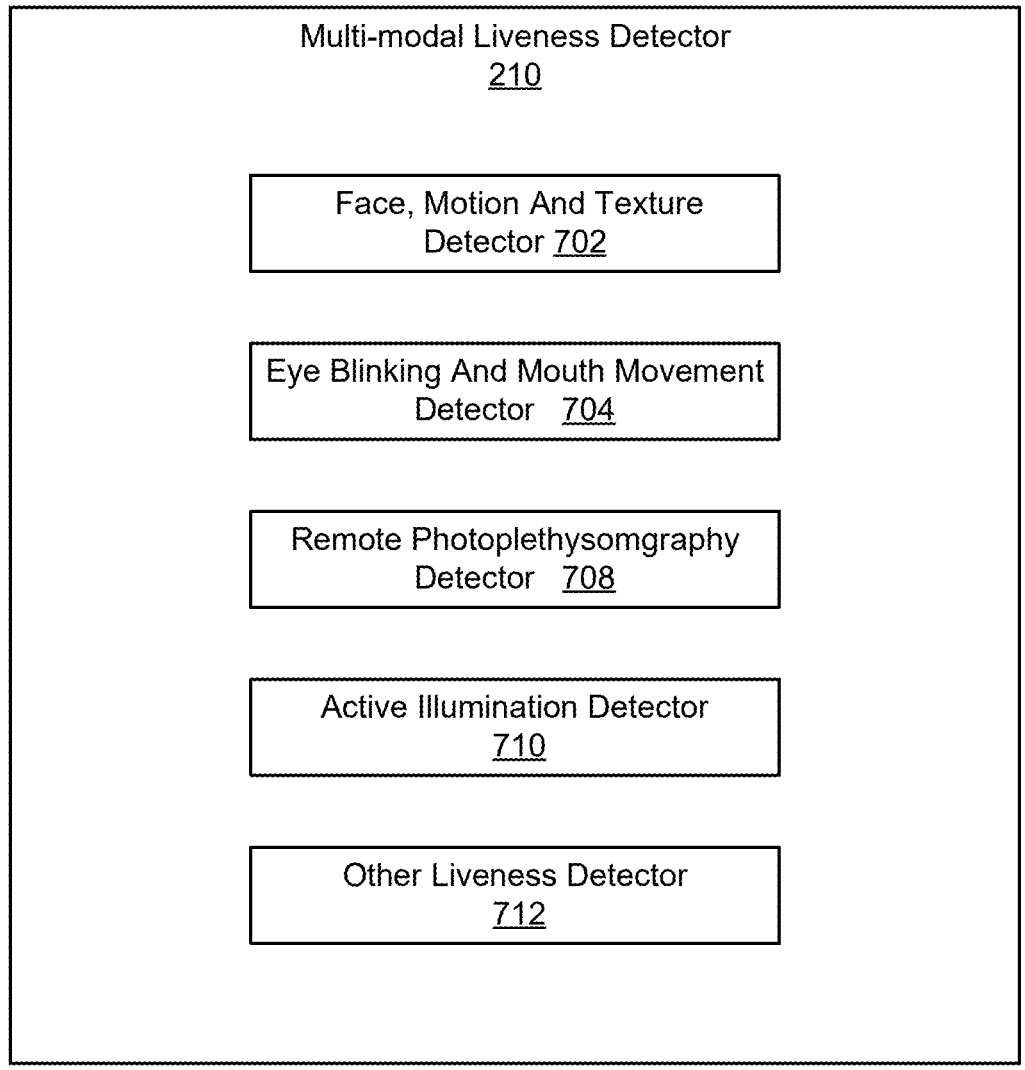
FIG. 7 is a block diagram showing a multi-modal liveness detector in accordance with some implementations.

Referring now to FIG. 7, an example multi-modal liveness detector 210 according to some implementations is shown. In the implementation depicted, the multi-modal liveness detector 210 comprises a face, motion, and texture detector 702, an eye blinking and mouth movement detector 704, a remote photoplethysmography detector 708, and one or more other liveness detectors 710. FIG. 7 is used to illustrate how the multi-modal liveness detector 210 is scalable in two dimensions just like the multi-modal biometric identifier 208. Again, the multi-modal liveness detector 210 is scalable in a first dimension because each of the components 702, 704, 708, 710 and 712 detect two or more liveness conditions. The multi-modal liveness detector 210 is scalable in a second dimension in that any number of additional other liveness detectors 712 may be added to the multi-modal liveness detector 210. For example, different detectors, even if only for a single liveness condition may be added. The different detectors may be for any one liveness condition, including but not limited to, face movement, eye movement, eye blinking, blood flow (rPPG), sleeping condition, facemask or face covering, movement, liveness, voice liveness, voice synchronization, etc. Given the sophistication of fraud attacks, the multi-modal liveness detector 210 which uses different combinations of techniques (e.g., eye/face/head motion, face texture, etc.), is much less likely to be successfully attacked.

The face, motion, and texture detector 702 may be steps, processes, functionalities, software executable by a processor, or a device including routines configured to detect face, a particular motion, and a texture, in physical biometric information 304 and behavioral biometric information 306. The face, motion, and texture detector 702 detects a combination of three liveness features thereby making it difficult to successfully attack. The face, motion, and texture detector 702 is coupled to receive behavioral biometric information 306 from the user attribute and behavior collector 402 of the registration module 202 or the user attribute and behavior determiner 502 of the authentication module 206. The output of the face, motion, and texture detector 702 is provided back to the registration module 202 or the authentication module 206 for determining if a user 112 is real.

The eye blinking and mouth movement detector 704 may be steps, processes, functionalities, software executable by a processor, or a device including routines configured to detect two conditions: eye blinking and mouth movement. For example, eye blinking (humans blink 15-20 times a second) is a human behavior that is both an automatic non-conscious natural function as well as a controllable function when a user closes their eyes. In some implementations, the eye blinking and mouth movement detector 704 may also detect eye movement and other involuntarily human body functions that are measurable. For example, for eye movement, the detector 704 may include an eye movement detector that uses an automated eye-movement-driven approach (EMA) or detects the optokinetic nystagmus (OKN), which is a reflexive sawtooth motion of the eye. The eye blinking and mouth movement detector 704 is advantageous because it can detect liveness by virtue of measuring two physical biometric characteristics that are difficult for a fraudulent user to coordinate. Thus, this detector 704 is difficult to surpass. The eye blinking and mouth movement detector 704 is coupled to receive physical biometric information 304 from the user attribute and behavior collector 402 of the registration module 202 or the user attribute and behavior determiner 502 of the authentication module 206. The output of the eye blinking and mouth movement detector 704 is provided back to the registration module 202 or the authentication module 206 for determining if the user 112 is real. The detection of eye blinking is a mechanism that is particularly effective to detect deepfakes because natural blinking is extremely difficult for deepfakes to copy of mimic.

The remote photoplethysmography detector 708 may be steps, processes, functionalities, software executable by a processor, or a device including routines configured to detect photoplethysmography (PPG) remotely. The remote photoplethysmography detector 708 captured images and uses them to detect volumetric changes in blood in peripheral circulation. The remote photoplethysmography detector 708 processes the facial image and detects for color changes in the face due to blood flow. For example, a heat map may be produced from an image during a registration, and a similar heat map may be produced during authentication. The images may be compared to determine whether the peripheral circulation of the user is similar enough to satisfy the threshold. The remote photoplethysmography detector 708 is coupled to receive physical biometric information 304 from the user attribute and behavior collector 402 of the registration module 202 or the user attribute and behavior determiner 502 of the authentication module 206. The output of the remote photoplethysmography detector 708 is provided back to the registration module 202 or the authentication module 206 for determining if a user 112 is real.

The one or more other liveness detectors 710 may be steps, processes, functionalities, software executable by a processor, or a device including routines configured to detect one or more liveness conditions. It should be understood that a single liveness condition may be detected in situations where that particular liveness indicator is difficult or nearly impossible to mimic or copy. In other instances, combinations of liveness conditions may be detected where it is difficult to mimic or copy the combination of a first liveness condition with the second liveness condition. For example, a second liveness check can be effectively used where the fraudster is able to spoof one liveness check.

Figure 8:
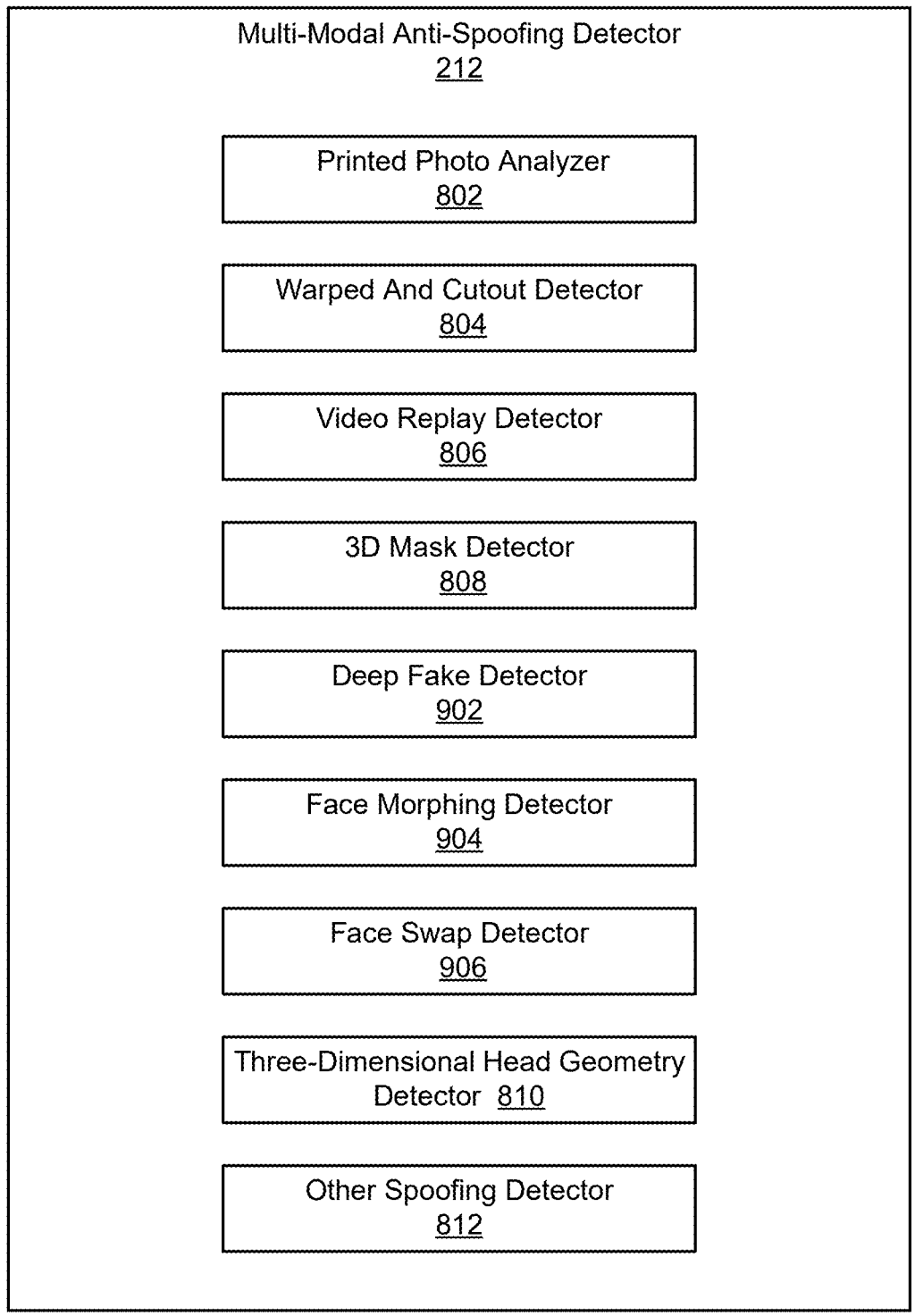
FIG. 8 is a block diagram showing a multi-modal spoofing detector in accordance with some implementations.

Referring now to FIG. 8, an example multi-modal spoofing detector 212 in accordance with some implementations is shown. The multi-modal spoofing detector 212 comprises a printed photo analyzer 802, a warped and cut out detector 804, a video replay detector 806, a 3D mask detector 808, a deep fake detector 902, a face morphing detector 904, a face swap detector 906, and an other facial spoofing detector 812. The multi-modal spoofing detector 212 is scalable in one dimension in that any number of additional other spoofing detectors may be added. This scalability is particularly advantageous because with anti-spoofing the attack vector is not known, so the multi-modal verification and authentication system 120 has to have protection against ALL attacks all the time, and as new effective spoofing methods are created, the multi-modal spoofing detector 212 can easily be adapted the add the new spoofing methods. The multi-modal spoofing detector 212 adds known fraud spoofing models to address the known and unknown attacks to the "Selfie" capture process. While the example depicted in FIG. 8 shows examples of facial spoofing, and some implementations, the multi-modal spoofing detector 212 may include combinations of other spoofing modes for deepfake voice and other biometrics.

The printed photo analyzer 802 may be steps, processes, functionalities, software executable by a processor, or a device including routines configured to detect a printed photo attack where a user submits an image of another photo that is printed or displayed on another display device. The printed photo analyzer 802 is coupled to receive image information from the registration module 202 or the authentication module 206. The printed photo analyzer 802 analyzes the image and outputs a signal indicating whether the image is a spoofing attack. The printed photo analyzer 802 is coupled to provide the signal back to the registration module 202 or the authentication module 206.

The warped and cut out detector 804 may be steps, processes, functionalities, software executable by a processor, or a device including routines configured to detect manipulated images in which video has been warped and/or a face image cut out has been placed in front of the face of the user when an image is captured. The warped and cut out detector 804 is coupled to receive image information from the registration module 202 or the authentication module 206. The warped and cut out detector 804 processes the image and detects images that have been manipulated with this technique and determines whether it is a spoofing attack. The warped and cut out detector 804 is coupled to provide the signal back to the registration module 202 or the authentication module 206 indicating whether the image submitted is a spoofing attack.

The video replay detector 806 may be steps, processes, functionalities, software executable by a processor, or a device including routines configured to detect a video replay attack. A video replay attack is when a bad actor loops video of another user's face and presents it as a live the image. The video replay detector 806 receives video from the registration module 202 or the authentication module 206. The video replay detector 806 processes the received video and determines whether it is just video being looped and replayed. If so, the video replay detector 806 signals the registration module 202 or the authentication module 206 indicating that it is a spoofing attempt.

The 3D mask detector 808 may be steps, processes, functionalities, software executable by a processor, or a device including routines configured to detect a mask over a portion of a user's face. The 3D mask detector 808 processes the video image, for example, processing the image with a binary classifier discriminate between a real face in a 3D mask. The 3D mask detector 808 processes received images and signals the registration module 202 or the authentication module 206 indicating whether it is a spoofing attempt.

The deep fake detector 902, the face morphing detector 904, and the face swap detector 906 are described below in more detail below with reference to FIG. 9 and have the same functionality here.

The three-dimensional head geometry detector 810 may be steps, processes, functionalities, software executable by a processor, or a device including routines configured to detect liveness based upon the head geometry of the user 112 in an image or video. The three-dimensional head geometry detector 810 is coupled to receive physical biometric information 304 from the user attribute and behavior collector 402 of the registration module 202 or the user attribute and behavior determiner 502 of the authentication module 206. The three-dimensional head geometry detector 810 processes the received information and determines whether it matches data stored in the IAO 302. The three-dimensional head geometry detector 810 determines if the physical biometric information being input for a user is the same person for which the same information was requested and received during registration process and that was stored in IAO 302 as physical biometric information 304. The three-dimensional head geometry detector 810 outputs its comparison results back to the registration module 202 or the authentication module 206 for determining whether the user 112 is the same. In some implementations, the three-dimensional head geometry detector 810 may also be used to detect face swaps, face morphs or other repeated anti-spoofing or fraud attempts.

The other spoofing detector 812 may be steps, processes, functionalities, software executable by a processor, or a device including routines configured to detect any new facial spoofing techniques or other biometric spoofing such as voice. This illustrates how additional modes may be added to the multi-modal anti-spoofing detector 212.

Figure 9:
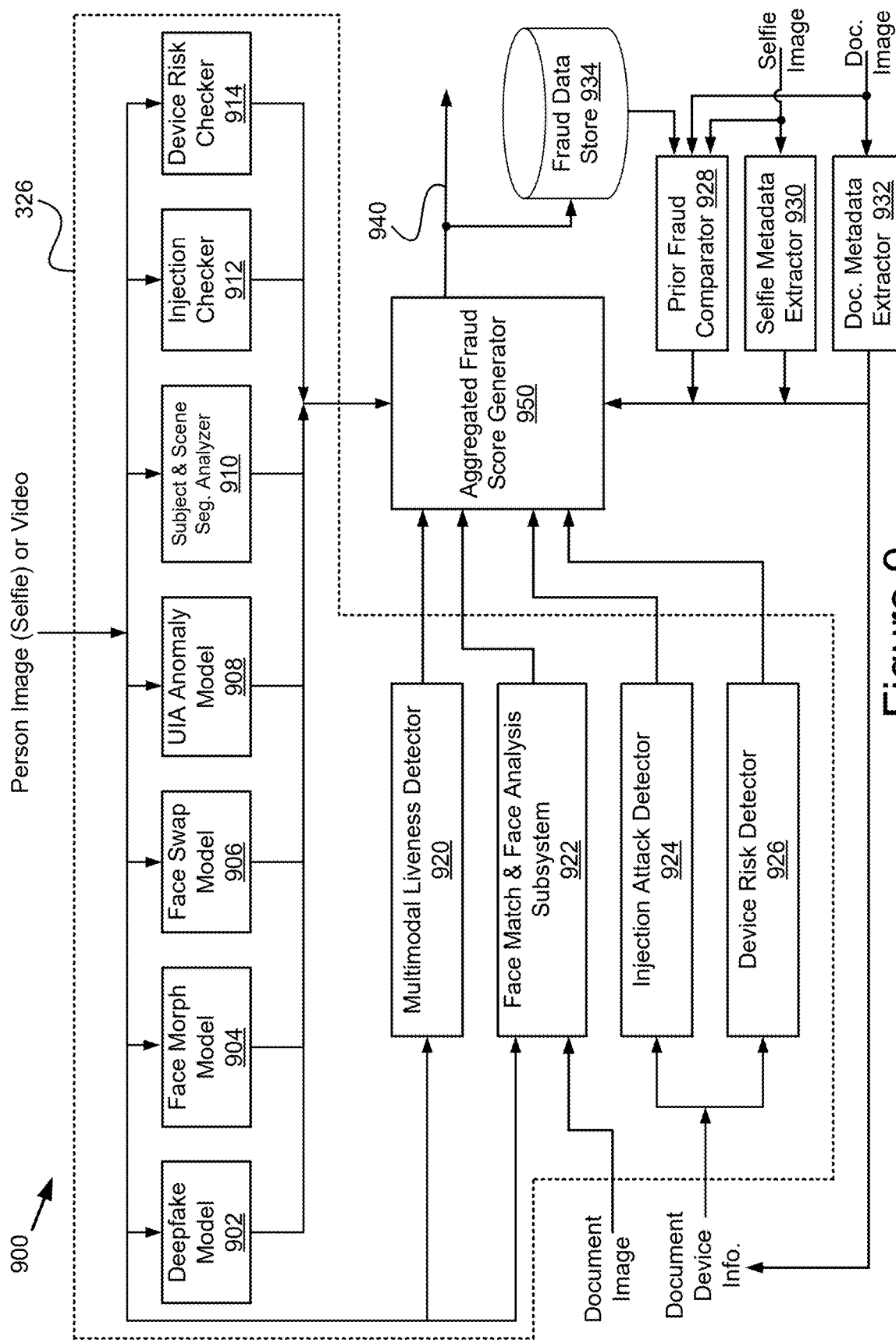
FIG. 9 is a block diagram showing an anti-injection attack architecture having one or more multi-modal spoofing detectors and one or more multi-modal liveness detectors in accordance with some implementations.

Referring now to FIG. 9, an example implementation for an anti-injection attack system 900 having one or more multi-modal spoofing detectors and one or more multi-modal liveness detector is shown. As shown in FIG. 9, the anti-injection attack system 900 comprises a deepfake model 902, a face morphed model 904, a face swap model 906, an unknown injection attack (UIA) anomaly model 908, a subject and scene segmentation analyzer 910, an injection checker 912, a device risk checker 914, a multi-modal liveness detector 920, a face match and face analysis subsystem 922, an injection attack detector 924, and a device risk detector 926. The deepfake model 902, the face morphed model 904, the face swap model 906, the UIA anomaly model 908, the subject and scene segmentation analyzer 910, the injection checker 912, the device risk checker 914, the multi-modal liveness detector 920, and the face match and face analysis subsystem 922 are each coupled in parallel to receive an input image or video and provide their output to the aggregated fraud score generator 950. For example, the input image is most typically an image of a person or a selfie. The face match and face analysis subsystem 922 is also coupled to receive a document image. The injection attack detector 924 and the device risk detector 926 are coupled to receive document device information. In some implementations, this document device information is received directly. In other implementations, this document device information is the same information sent to the aggregated fraud score generator 950 that is extracted an output by the document metadata extractor 932. The injection attack detector 924 and the device risk detector 926 are also coupled to provide their output to the aggregated fraud score generator 950. The deepfake model 902, the face morphed model 904, the face swap model 906, the UIA anomaly model 908, the subject and scene segmentation analyzer 910, the injection checker 912, the device risk checker 914, the multi-modal liveness detector 920, and the face match and face analysis subsystem 922 may each be steps, processes, functionalities, software executable by a processor, or a device including routines to perform the operation and functionality described below for each component.

On obtaining or receiving the selfie image or video, the anti-injection attack system 900 determines whether it is a valid selfie of a live individual or a fraud attack. To determine if it is an attack, the anti-injection attack system 900 analyzes the selfie by a series of models 902, 904, and 906 trained on previously seen deepfake, face morph and face swap attack examples. The anti-injection attack system 900 also processes the selfie with the UIA anomaly model 908 to determine whether it may be an unknown injected attack. In parallel, the device is checked to see if it has been used before in fraud attacks by the injection checker 912, in particular, whether the image is an injection attack bypassing the camera is in play; and the device risk checker 914 determines if the cameras and images/videos used in the process have clean metadata. In some implementations, a fraud data store 934 stores a fraud database of previously seen fraud attacks and the images used for those fraud attacks. In such an implementation, any of the components of the injection attack system 900 may access the fraud database to check if a person, image, signature, PII real or false data has been processed before. Additionally, the selfie image and the document image are also sent to a prior fraud comparator 928. The prior fraud comparator 928 also has access to retrieve prior known fraud images, fraud assets (digital signature, hashes, etc.), image meta data, or prior fraud detection signals from the fraud data store 934. The prior fraud comparator 928 can query the fraud data store 934 for any images or fraud assets in the fraud data store 934 that match the selfie image or the document image. The prior fraud comparator 928 compares the received selfie image and the received document image to any images or fraud assets used in prior fraud attacks and signals the aggregated fraud score generator 950 if there is a similarity match. Effectively, the prior fraud comparator 928 accesses the fraud data store 934 or any other location that stores prior confirmed fraudulent images or data and compares the selfie image and the document image to perform a series of checks on all incoming data with previously seen fraud assets. It should be noted that the fraud data store 934 is also coupled to signal line 940 to receive images that are confirmed to be fraudulent by the aggregated fraud score generator 950.

Two further checks are performed, namely multi-modal liveness check by the multi-modal liveness detector 420 and subject and scene segmentation analysis by the subject and scene segmentation analyzer 410. The scores from each of these individual components 402, 404, 906, 908, 910, 912, 914, and 920 are provided as input to the aggregated fraud score generator 950. An image of the document or document scan, document device information and associated metadata used to capture the document are also used to assess an attack by the anti-injection attack system 900.

The anti-injection attack system 900 also receives document device information and a document image or document scan. In the case of the document scan, the holder image of the document scan is assessed by the face match and face analysis subsystem 922 against the selfie for a face match. The face match and face analysis subsystem 922 also analyzes the selfie and compares it to the gender, age, etc. on the document for a match. The face match and face analysis subsystem 922 outputs a signal representative score to the aggregated fraud score generator 950. The document device information is used by the injection attack detector 924 and the device risk detector 926 to determine if the device used to capture the document was used in prior fraud attacks and also if the document was injected. In some implementations, the device risk detector 926 can be a component provided by a third party. These checks and subsequent scores are also sent to the aggregated fraud score generator 950.

The deepfake model 902, the face morphed model 904, the face swap model 906 are models to detect these specific types of image generation techniques used by fraudsters. These models 902, 904, and 906 may be implemented using deep learning models trained to detect imaged generated by deepfake tools, the face morphed tools, and the face swap tools, respectively. It should be understood that other machine learning or artificial intelligence methods in addition or in place of deep learning may be used. The fraudsters may generate a deepfake images using a variety of mechanisms, e.g., generative adversarial network-based ("GAN-based") synthetic faces, diffusion model-based synthetic faces, auto-encoder-based methods, etc. The fraudsters may modify a facial image (e.g., by morphing the facial features to be more similar to those in a document holder image) or replace a facial image (e.g., a face swap in which the document holder's face overlays the nefarious user's face). The deepfake model 902, the face morphed model 904, the face swap model 906 are AI/ML models to detect those types of manipulations of images.

The UIA anomaly model 908 is a model to detect injections attacks that have not been seen before. In some implementations, the UIA anomaly model 908 is a model to detect suspicious behavior that deviates from normal behavior. The UIA anomaly model 908 also detects threats and shows the corresponding threats when suspicious events corresponding to rules created through an attack profile are constantly occurring. The UIA anomaly model 908 may also be configured to detect malicious processes. The UIA anomaly model 908 generates a signal that can be used by the aggregate score generator as 950 in generating the accumulated score.

The subject and scene segmentation analyzer 910 processes the selfie image to detect segments of an image that have been used by fraudsters in the past. Example implementations for the subject and scene segmentation analyzer 910 will be described in more detail below with reference to FIG. 5. The subject and scene segmentation analyzer 910 is particularly advantageous because it can detect similarities and portions of an image that a fraudster has repeatedly used. The subject and scene segmentation analyzer 910 is also advantageous because it reduces the computational requirements by only having to process a portion of the scene and has increased accuracy due to scene segments having a greater degree of similarity. The subject and scene segmentation analyzer 910 outputs its score to the aggregated fraud score generator 950.

The injection checker 912 receives the selfie image and checks whether the selfie image was used in an injection attack in the past as has been described above, and if so, signals the aggregated fraud score generator 950.

The device risk checker 914 receives the selfie image, extracts the metadata from the selfie image and determines whether the metadata from the selfie image indicates whether the device was used previously to take the selfie (or any image) that has been used in a prior fraud attack in the past as has been described above, and if so, signals the aggregated fraud score generator 950. In some implementations, the device risk checker 914 can be a component of a third-party or can use information from other large data providers or vendors, for example, LexisNexis.

The multi-modal liveness detector 920 receives the selfie image and performs multi-modal liveness analysis. The multi-modal liveness detector 920 processes the selfie and performs two or more liveness detection checks on the received selfie image. The results of the liveness analysis by the multi-modal liveness detector 920 are provided to the aggregated fraud score generator 950.

The face match and face analysis subsystem 922 is coupled to receive the selfie image and also coupled to receive the document holder image. The face match and face analysis subsystem 922 performs two or more matching operations. The face match and face analysis subsystem 922 compares the selfie to the holder portion of the document image. Based on the comparison, the face match and face analysis subsystem 922 outputs a first signal to the aggregated fraud score generator 950. The face match and face analysis subsystem 922 also processes the document image to generate document holder characteristics, for example, age, gender, height, weight, eye color, hair color, etc. and analyzes the selfie image to determine whether the characteristics of the selfie image match the document holder characteristics. Based on the comparison, the face match and face analysis subsystem 922 outputs a second signal to the aggregated fraud score generator 950.

The injection attack detector 924 receives the document device information and checks whether the document device information is associated with a past injection attack. In some implementations, the injection attack detector 924 and the injection checker 912 perform the same processing merely on different input data sources, in particular, the injection attack detector 924 processes the document device information while the injection checker 912 processes the selfie image or video. In other implementations, the processing by the injection checker 912 and the injection attack detector 924 are different.

The device risk detector 926 receives the document device information, processes that metadata associated with the document, and determines whether the device is associated with past fraudulent attempts. In some implementations, the device risk detector 926 and the device risk checker 914 perform the same processing merely on different input data sources, in particular, the device risk detector 926 processes the document device information while the device risk checker 914 checker processes the selfie image or video. In other implementations, the processing by the device risks checker 914 and the device risk detector 926 are different.

It should be understood that one particular advantage of the above-described architecture for the anti-injection attack system 900 is that it is scalable, and that additional models or other detection types may be added to process the selfie image in parallel with components 902, 904, 906, 908, 910, 912, 914, and 920. This is particularly advantageous to be able to add additional models of detection types as the fraudsters develop new types of attack. For example, although not shown in FIG. 9, the anti-injection attack system 900 may also include a pose comparator. The pose comparator determines and compares a pose between multiple images. Assume that a request is associated with a first received input image is received that is a picture of a document with a document holder image (e.g., a picture ID) and a second received input image that is a selfie, and that the person in the document holder image and selfie need to match otherwise the request is rejected (e.g., as fraudulent). However, too close of a match may be indicative of reproduction and, therefore, fraud. In some implementations, the pose comparator determines and compares a pose between a document holder image (e.g., from a document image) and a facial image (e.g., from a selfie or video that may also be used for liveness detection). Such an example pose comparator receives image data, determines the pose (e.g., applies pose estimation) to each of the images to be compared, and compares the poses. For example, the pose comparator receives a set of associated images (e.g., responsive to a verification request that includes a selfie image and a document image), determines the pose of the document holder's facial image (e.g., based on key points associated with various facial features), determines the pose of the face in the selfie, and compares the pose to the selfie image. In a valid instance it is very unlikely, near impossible, that the user's pose (e.g., the pitch, roll, and yaw of the head or face and/or a facial expression) in the selfie would reproduce (i.e., be identical or nearly identical) the user's pose in the user's own document holder image. The pose comparator compares the poses and determines whether the pose between images satisfies a similarity threshold. The similarity threshold, when satisfied, may be indicative that the poses are sufficiently similar, which may be indicative of fraud. In some implementations, there may be multiple thresholds. For example, a first threshold of high pose similarity when satisfied may be associated with and indicative of fraud, a second threshold of moderate pose similarity, when satisfied may be associated with and indicative of inconclusiveness, and when neither the first or second threshold are satisfied it may be indicative of validity or an absence of fraud. The number of thresholds, or classification, may vary, e.g., in some implementations, there may be a single threshold (or two classes-one indicative of a suspiciously high pose similarity and another associated with non-suspicious pose similarity). In some implementations, the threshold(s) or classes may be determined using machine learning. For example, a classifier is trained to classify pairs of images (e.g., document image and selfie) into suspicious and non-suspicious classes based at least in part on their pose similarity score. The pose comparator is merely one example of new and additional fraud detection types that may be added to the anti-injection attack system 900.

In some implementations, the deepfake model 902, the face morphed model 904, the face swap model 906, the unknown injection attack (UIA) anomaly model 908, the subject and scene segmentation analyzer 910, the injection checker 912, the device risk checker 914, and the multi-modal liveness detector 920 may receive and process the document image in addition to the person's image or selfie. In such a case, the deepfake model 902, the face morphed model 904, the face swap model 906, the UIA anomaly model 908, the subject and scene segmentation analyzer 910, the injection checker 912, the device risk checker 914, and the multi-modal liveness detector 920 each outputs two signals to the aggregated fraud score generator 950, one signal or score for the selfie image and one signal or score for the document image. This is advantageous because it increases the accuracy of the fraud detection by having both the selfie image and the document image processed by each detector type.

The aggregated fraud score generator 950 receives signals from the components 902, 904, 906, 908, 910, 912, 914, 920, 922, 924, and 926 and uses those signals to generate an aggregate fraud signal on signal line 940. In one implementation, the components 902, 904, 906, 908, 910, 912, 914, 920, 922, 924, and 926 each generate a numerical score within a predefined range with one end of the range indicating fraud and the other end the range indicating the absence of fraud. The aggregated fraud score generator 950 combines those scores to produce the aggregated fraud signal. The aggregated fraud signal has a value between a minimum and maximum where a value satisfying a threshold between the minimum and maximum indicates that the selfie is an acceptable image, and a score or value that does not satisfy the threshold is a fraudulent image or an injection attack. For example, the aggregated fraud score generator 950 may be a gradient boosting machine learning model, e.g., XGBoost, trained on hundreds of parameters to provide an overall score. The output from components 902 to 932 could be scores between 0 and 1 and used to train the gradient boosting machine learning model with these signals or could feed another aggregated model trained only on the signals from the subsystems in FIG. 9. In some implementations, the numerical scores from each component 902, 904, 906, 908, 910, 912, 914, 920, 922, 924, and 926 are weighted to generate the aggregated fraud signal. In another implementation, some of the signals from the components 902, 904, 406, 408, 410, 412, 414, 920, 922, 924, and 926 input to the aggregated fraud score generator 950 are binary signals indicating the presence of fraud (false) or the absence of fraud (true). In such a case, the aggregated fraud score generator 950 includes logic to output a true signal indicating an image is acceptable or a false signal indicating the presence of fraud if any one of the components 902, 904, 906, 908, 910, 912, 914, 920, 922, 924, and 926 input a signal indicating the presence of fraud into the aggregated fraud score generator 950. In yet another implementation, the aggregated fraud score generator 950 includes logic that combines scores within a predefined range from some of the components 902, 904, 906, 908, 910, 912, 914, 920, 922, 924, and 926, and binary signals indicating the presence of fraud or the absence of fraud from other of the components 902, 904, 906, 908, 910, 912, 914, 920, 922, 924, and 926 to generate one or more aggregated fraud signals indicating the presence or absence of fraud for the selfie image submitted.

Figure 10A:
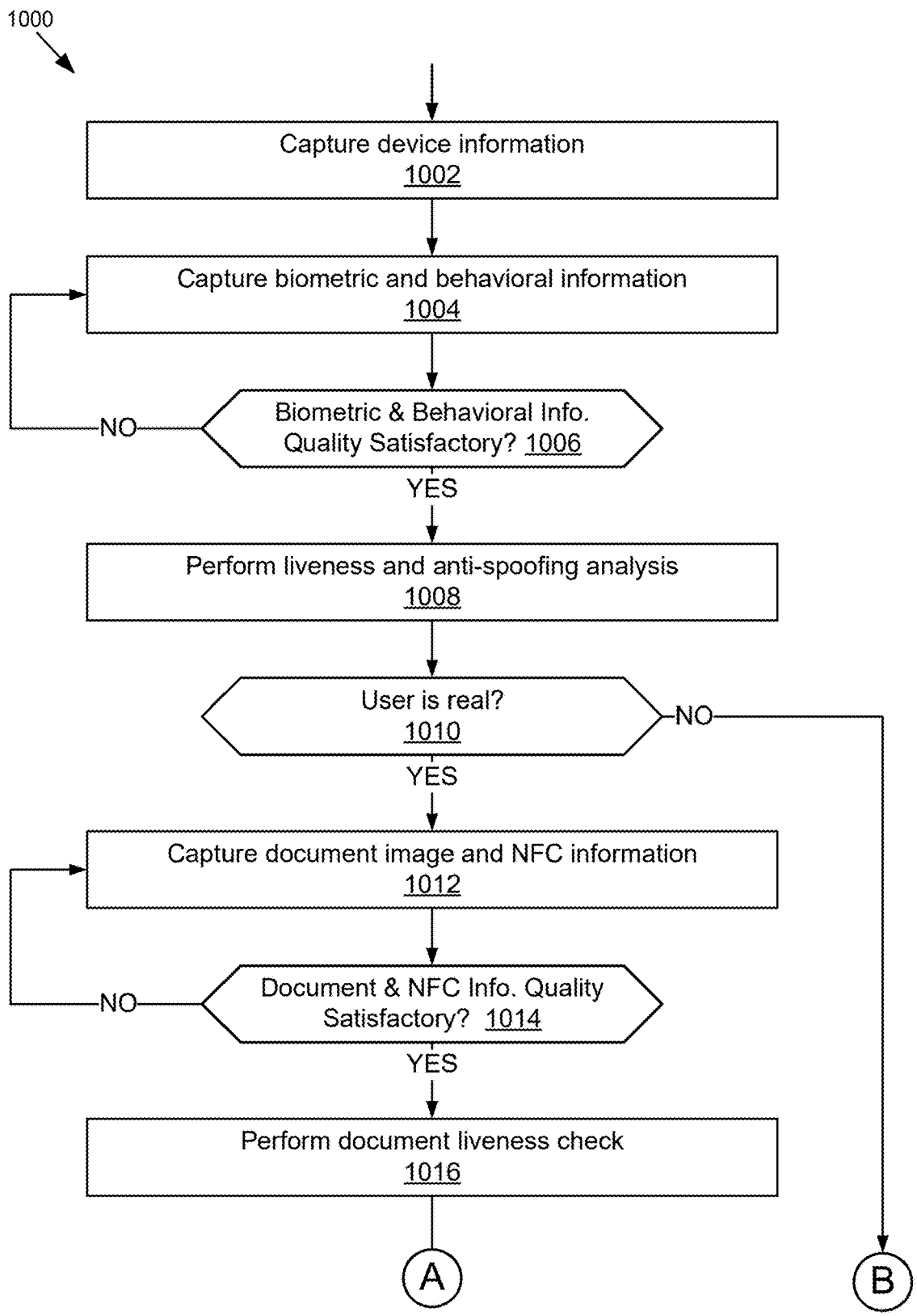
FIGS. 10A and 10B are a flow diagram showing a method for registering a user in the multi-modal verification and authentication system in accordance with some implementations.
Figure 10B:
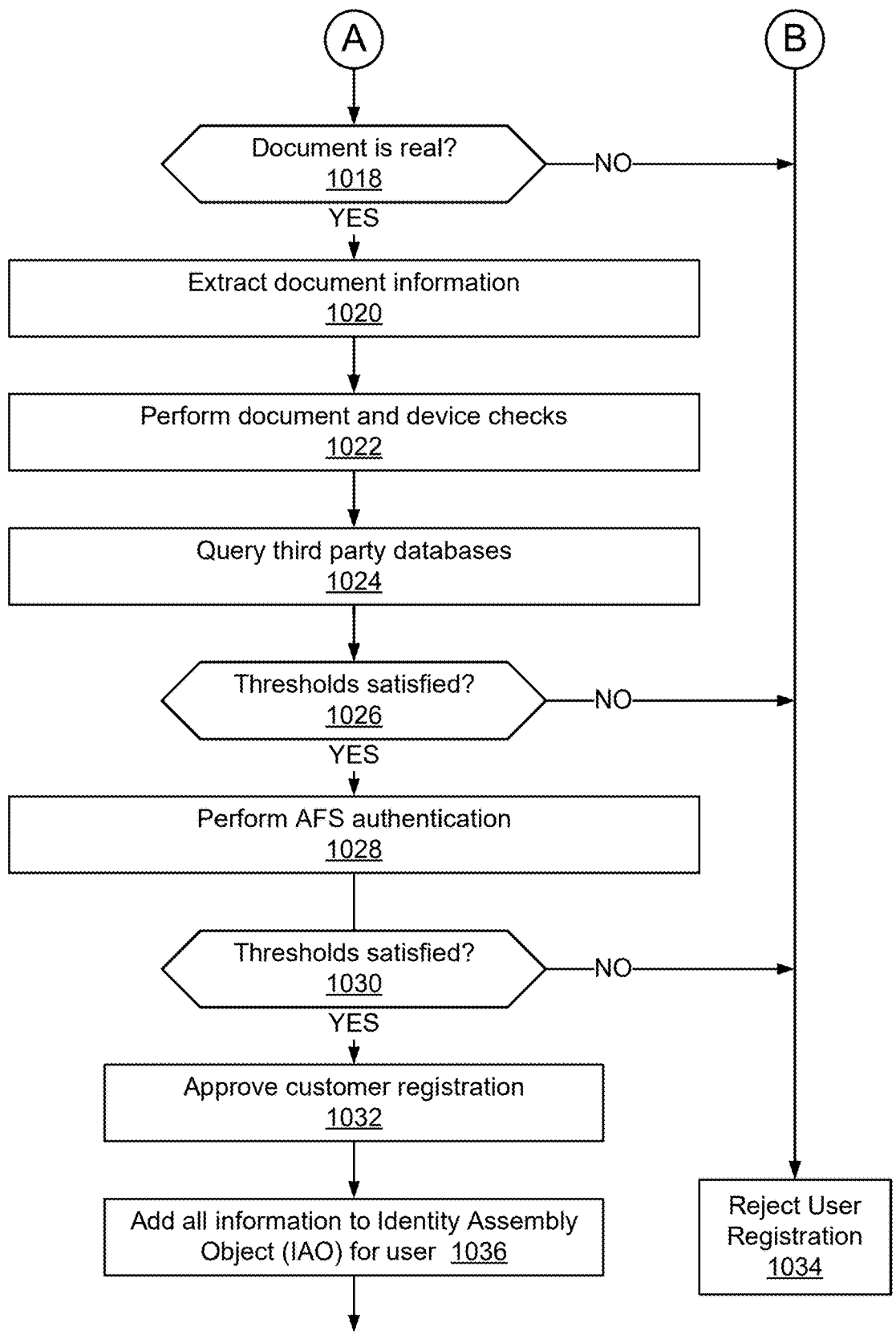

FIGS. 10A and 10B show an example method 1000 for registering a user 112 in the multi-modal verification and authentication system 120 according to some implementations. The method 1000 begins by capturing 1002 device information. For example, the device information collector 404 may collect information about a user's computing device 108. Examples of the types of device information that may be collected have been described above with reference to FIG. 3. The method 1000 continues by capturing 1004 physical biometric information and behavioral biometric information. For example, the user attribute and behavior collector 402 may be used to collect this information. Again, examples of physical biometric information 304 and behavioral biometric information 306 have been described above with reference to FIG. 3. In some implementations, additional voice biometrics or a series of behavioral biometrics may be added to strengthen the security of the registration and authentication process. Next, the method 1000 determines whether the physical biometric information and behavioral biometric information captured satisfies a quality threshold. If not, the method 1000 repeats the capture 1004 step to secure or capture better or additional physical biometric information and behavioral biometric information. On the other hand, if the captured information satisfies the quality threshold, then the method 1000 performs 1008 liveness and anti-spoofing analysis. For example, the processed and captured physical biometric information and behavioral biometric information can be sent to the multi-modal liveness detector 210 and the multi-modal anti-spoof detector 212 for this analysis. The method 1000 continues by determining 1010 whether the user 112 is real or authentic based on the results of the liveness and anti-spoofing analysis. If the method 1000 determines that the user is not real, then the method 1000 proceeds to block 1034 to reject user registration. However, if the method 1000 determines that the user is real, the method 1000 captures 1012 a document image and near field communication (NFC) information. For example, an image of the front and back sides of an identification document may be captured. The document information collector 408 may be used to process the document image and extract biographical information, identification numbers, etc. from the images. The document information collector 408 may also retrieve information using the NFC for similar information. Next, the method 1000 determines 1014 whether the document information and the NFC information satisfy a quality threshold. If it is determined that the quality threshold is not satisfied, the method 1000 returns to block 1012 to capture another document image and additional NFC information. However, if it is determined the quality threshold is satisfied, the method 1000 proceeds to perform 1016 a document liveness check using the captured document image and NFC information. Document liveness is one or more processes for verifying the authenticity of a document. It verifies that the document images submitted are not fraudulent or tampered with by the person who has submitted them. For example, to determine document liveness, the multi-modal verification and authentication system 120 captures an image of an identity document, then processes the image, and ensures its quality is sufficient to perform the analysis. In some implementations, a plurality of images or image sequences of 7 or more image are captured and analyzed to determine document liveness. The multi-modal verification and authentication system 120 analyzes specific features of the document, such as text, photos, and security marks to ensure that the document is physically present and authentic, rather than a digital replica or copy manipulated or modified.

As shown in FIG. 10B, next, the method 1000 determines 1018 whether the document is real or authentic. If the document is determined not to be real, the method 1000 proceeds to block 1034 to reject user registration. If the document is determined to be real, the method 1000 proceeds to extract 1020 document information, perform 1022 document device checks, and query 1024 third-party databases for information. In some implementations, the method 1000 performs a 1:1 and 1:n face match. The query 1024 of third-party databases may include performing a fraud database lookup and also searching the dark web for the presence of the user's information. Each of the queries and checks may have a different threshold to determine whether the results are satisfactory. In one implementation, if any one of the checks is not satisfied, the registration is rejected. In another implementation, if a predefined number of checks are not satisfied the registration is rejected. In yet another implementation, if even one of the checks in blocks 1020, 1022 and 1024 satisfies the threshold then the user is allowed to register. The method 1000 continues by determining 1026 whether the threshold(s) are satisfied. If not, the method 1000 continues to block 1034 and rejects user registration. On the other hand, if the method 1000 determines that the thresholds are satisfied, the method 1000 proceeds to block 1028. In block 1028, the method 1000 performs an AFS authentication. Next the method 1000 determines 1030 whether the AFS authentication was satisfied. If not, registration of the user is again rejected in block 1034. However, if the AFS authentication threshold is satisfied, the method 1000 proceeds from block 1030 to block 1032 and registration of the customer is approved. Once all the necessary ID assets are obtained, compared, verified, checked for fraud, and stored, the user 112 is assumed registered and ready for ongoing authentication sessions If the registration is approved, the user 112 and computing device 108 pair is approved. The user 112 and computing device 108 pair is then entered into the identity registry 214, and the information from the above steps is used to create an IAO 302 and the IAO 302 is stored in the identity registry 214 to complete the process.

FIGS. 11A to 11C show an example of method 1100 for authenticating a user with the multi-modal verification and authentication system 120 in accordance with some implementations. The method 1100 begins by capturing 1102 device information. For example, the device information determiner 504 of the authentication module 206 may be used to capture the device information of a user 112 attempting to be authenticated. The method 1100 then captures 1104 physical biometric information and behavioral biometric information. The physical biometric information and behavioral biometric information may be stored temporarily by the authentication module 206 for later use in this process. The physical biometric information and behavioral biometric information may be captured using the user attribute and behavior determiner 502 of the authentication module 206. Next, the method 1100 determines 1106 whether the physical biometric information and behavioral biometric information satisfies a quality threshold. If not, the method 1100 returns to block 1104 to recapture the physical biometric information and behavioral biometric information or capture additional physical biometric information and/or behavioral biometric information. If the quality of the physical biometric information and behavioral biometric information is satisfactory, the method 1100 continues to perform 1108 liveness and anti-spoofing analysis. Next the method 1100 determines 1110 whether the user is real or authentic based upon the liveness and anti-spoofing analysis performed in block 1108. If the user is determined to not be real, the method 1100 proceeds to reject 1150 the user as a fraudster and to reject authentication. On the other hand, if the user is determined to be real, the method 1100 proceeds to perform 1112 a face match. For example, this may be a 1:1 face match or a 1:n face match, or both. Next the method 1100 determines 1114 whether there is a single face match. If there is not a single face match, the method 1100 proceeds to block 1140 of FIG. 11C and refers the user 112 to perform an initial registration or a re-registration. The initial registration process 1000 has been described above with reference to FIGS. 10A and 10C. The re-registration process 1200 will be described in more detail below with reference to FIGS. 12A and 12B. If it is determined in block 1114 that there is a single face match, the method 1100 proceeds to block 1116 of FIG. 11B. In block 1116, the method 1100 retrieves user information from an IAO 302. Using the information that the authentication process has received so far, a matching IAO 302 should be able to be determined and retrieved from the identity registry 214. Next the method 1100 determines 1118 whether an identification document is still valid. For example, the method 1100 may retrieve information from the IAO 302 and determine whether an identification document, e.g., a driver's license is still valid and has not expired. The IAO 302 should store identification documents and information about them for the user 112. Next, the method 1100 extracts 1120 biometric data from the physical biometric information and behavioral biometric information captured in block 1104. The method 1100 continues by determining 1122 whether the information extracted from the data/image matches the information stored in the IAO 302. If not, the method 1100 proceeds to block 1140 of FIG. 11C and refers the user to perform an initial registration or a re-registration. However, if the extracted data does match the data in the IAO 302, then the method 1100 performs 1124 document and device checks. For example, these document device checks may include accessing databases to determine if the user has been a victim of fraud or identity theft, performing device risk analysis on the device information received, determining whether third-party signals have been received indicating the user's identity has been compromised, comparing behavioral biometrics to the IAO 302, and other checks. Next the method 1100 determines 1126 whether the thresholds for each of the document and device checks are satisfied. If any one of the thresholds for the above identified document or device checks are not satisfied, the method 1100 proceeds block 1140 of FIG. 11C and request that the user perform registration or re-registration. If in block 1126, the thresholds are satisfied, then the method proceeds to perform 1128 AFS authentication. Transitioning to FIG. 11C, next, the method 1100 determines 1130 whether the AFS authentication threshold was satisfied. If not, the method 1100 proceeds to block 1140 to again refer the user to perform registration or re-registration. If the threshold in block 1130 is satisfied, the method 1100 continues by determining whether the authentication module 206 has received any notifications that the identity of the user has been compromised or searches the dark web for the presence of the information of the user 112. Next, the method 1100 determines 1134 whether any notifications that the identity of the user has been compromised have been received or any searches of the dark web show the presence of the information of the user 112. If so, the method 1100 proceeds to block 1140 and requires that the user 112 perform registration or re-registration. On the other hand, if no notifications that the identity of the user 112 has been compromised have been received or the searches of the dark web do not show the presence of the information of the user 112, the method approves or authorizes 1136 the user 112, and all of the information from this authentication process is captured 1138 and added to the IAO 302 of the user 112.

Figure 12A:
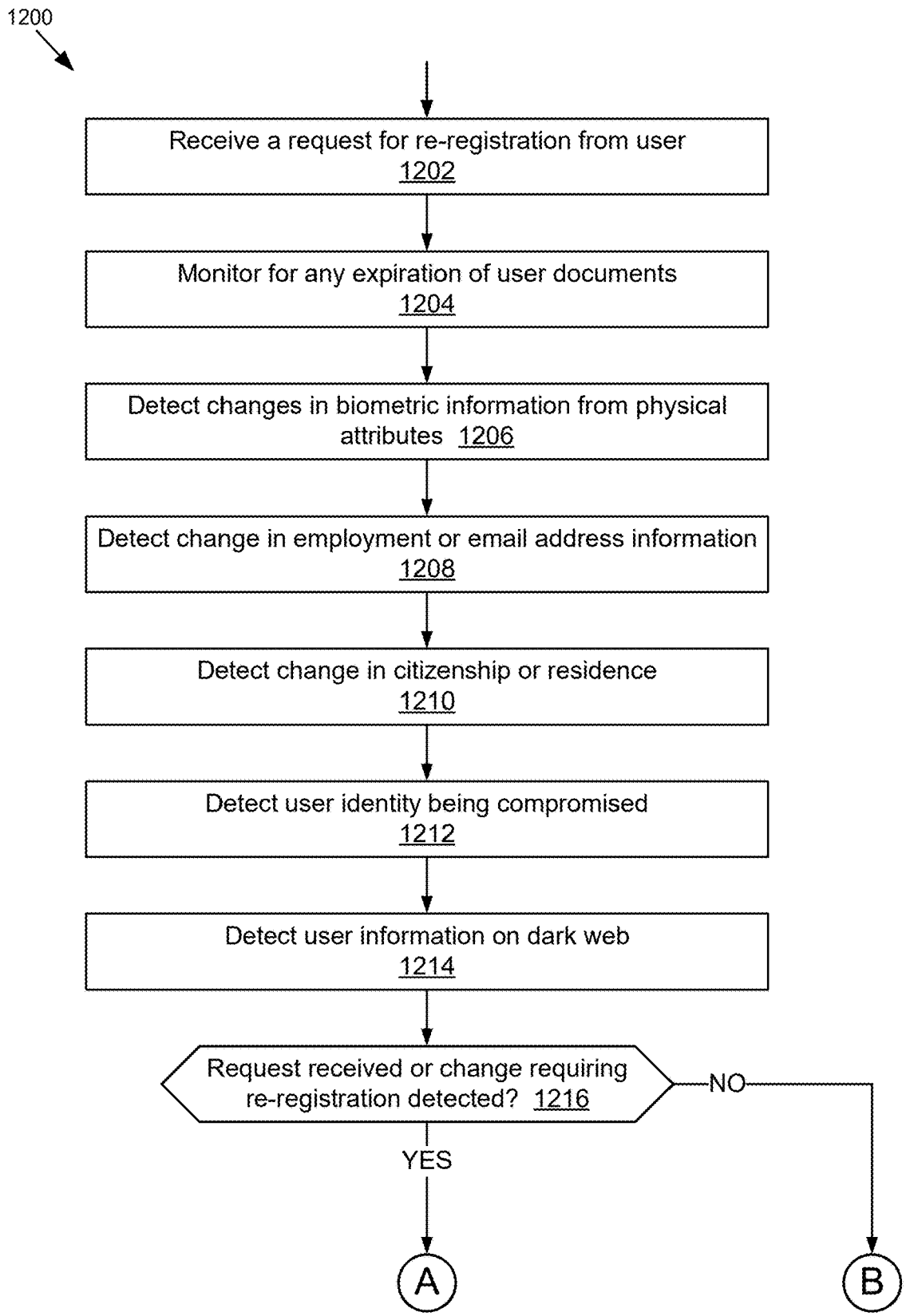
FIGS. 12A and 12B are a flow diagram showing a method for determining and performing re-registration in accordance with some implementations.
Figure 12B:
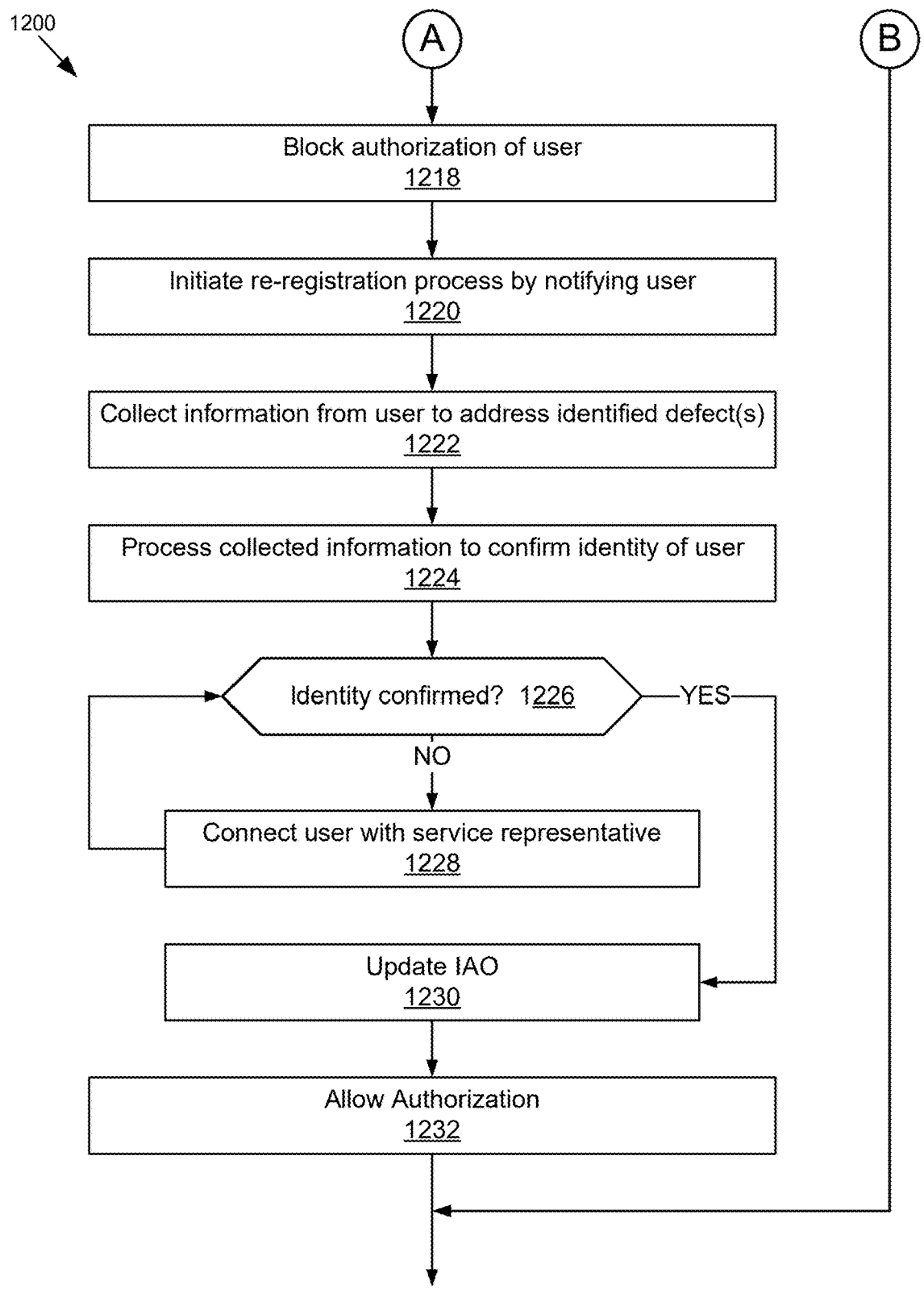

Referring now to FIGS. 12A and 12B, a method 1200 for determining and performing re-registration in accordance with some implementations will be described. The method 1200 begins by determining whether re-registration should be performed. This determination is done by checking for a number of different changes in conditions or status. These checks may be performed in any order, and they do not need to be performed in the order of blocks 1202 to 1214. The method 1200 determines 1202 whether a request for re-registration from a user has been received. The method 1200 also monitors 1204 for the expiration of any user identification documents, for example passport, driver's license, or other identification card. The method 1200 also detects 1206 any changes in biometrics information from physical attributes. For example, aging, hair color change, facial hair, change of eye color, change of contact lenses may require a re-registration process. The method 1200 also detects 1208 any changes in employment or email address information. The method 1200 additionally detects 1210 any changes in citizenship or residence. The method 1200 may also access third-party systems to determine 1212 whether the identity of the user 112 has been compromised. Furthermore, the method 1200 may access the dark web to determine whether the information of the user 112 is present. It should be understood that a variety of other checks may be performed to determine whether a user 112 should be encouraged or required to perform re-registration. After all the statuses have been checked or detected, the method 1200 determines 1216 whether the system 120 has received a request for re-registration or a change has been detected that requires re-registration. If not, the method 1200 is complete or can return to the beginning to check status on the conditions tested in blocks 1202 to 1214. On the other hand, if a request for re-registration has been received or a change requiring re-registration has been detected, the method 1200 proceeds to block 1218 of FIG. 12B. In block 1218, the method 1200 blocks authorization of the user so that no authorizations of the user will be given until the user performs re-registration. Next the method 1200 initiates 1220 a re-registration process by sending a notification to the user. Then the method 1200 proceeds to collect 1222 information from the user 112 to address any defects detected in blocks 1202 to 1214. The method 1200 continues with the registration module 202 processing 1224 the information collected to confirm the identity of the user. This may include performing a variety of analysis and confirmation steps on the information from the user collected in block 1222. Next, the method 1200 determines 1226 whether the identity was confirmed by the processing of the collected information in block 1224. If the identity was not confirmed, the method 1200 proceeds to connect 1228 the user with a customer service representative. The customer service representative and the user 112 can interact directly to collect various information and verify the identity of the user. Once the customer service representative and the user 112 have connected, the method 1200 returns to block 1226. If the identity was confirmed in block 1226, the method 1200 updates 1230 the IAO 302 and allows 1232 authorization for verification of the user.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and operations on data within a computer memory. An algorithm is here, and generally, conceived to be a self-consistent set of operations leading to a desired result.

To facilitate description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The technology described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

The structure, algorithms, and/or interfaces presented herein are not inherently related to any particular computer or other apparatus. Various general-purpose systems may be used with programs in accordance with the teachings herein, or it may prove convenient to construct more specialized apparatus to perform the described methods. The structure for a variety of these systems will be apparent from the description above. In addition, the techniques introduced herein are not described with reference to any particular programming language. It will be appreciated that a variety of programming languages may be used to implement the techniques as described herein.

The foregoing description has been presented for the purposes of illustration and description. It is not intended to be exhaustive or to limit the techniques to the precise form disclosed. Many modifications and variations are possible in light of the above teaching. As will be understood by those familiar with the art, the techniques may be implemented in other specific forms without departing from the spirit or essential characteristics thereof. Likewise, the particular naming and division of the modules, routines, features, attributes, methodologies, and other aspects are not mandatory or significant, and the mechanisms that implement the techniques or its features may have different names, divisions and/or formats.

What is claimed is:

1. A computer-implemented method comprising:
   receiving, using one or more processors, device information for a device associated with a user;
   receiving, using the one or more processors, physical biometric information of the user;
   receiving, using the one or more processors, behavioral biometric information of the user;
   performing, using the one or more processors, liveness analysis on the physical biometric information and the behavioral biometric information;
   determining whether the user is authentic based upon the liveness analysis;
   capturing, using the one or more processors, document information related to a document of the user;
   performing, using the one or more processors, a liveness check on the document information;
   determining whether the document is authentic based upon the liveness check; and
   in response to determining that the user is authentic, and the document is authentic, registering the user in an identity registry;
   further comprising:
   performing file system authentication using the device information;
   determining whether the file system authentication satisfies a threshold; and
   responsive to the file system authentication not satisfying the threshold, rejecting registration of the user and the device.

2. The computer-implemented method of claim 1, wherein registering the user in the identity registry includes creating an identity assembly object including the device information, the physical biometric information, and the behavioral biometric information and storing the identity assembly object in a database that is the identity registry.

3. The computer-implemented method of claim 1, wherein:
   the physical biometric information is one or more from a first group of a face, a voice, an iris, a sclera, eye color, hair color, aging, a palm, a signature, a fingerprint, a finger length, left-handed or right-handed, a gender, ethnicity, and DNA parameters; and
   the behavioral biometric information is one or more from a second group of body movement, device-based gestures, a voice pattern, and other behavioral biometric information that can be derived from the device information.

4. The computer-implemented method of claim 1, further comprising:
   determining whether the physical biometric information satisfies a first quality threshold;

determining whether the behavioral biometric information satisfies a second quality threshold;
responsive to the physical biometric information not satisfying the first quality threshold, capturing additional biometric information; and
responsive to the behavioral biometric information not satisfying the second quality threshold, capturing additional behavioral information.

5. The computer-implemented method of claim 1, further comprising:
performing an anti-spoofing analysis on the physical biometric information and the behavioral biometric information;
determining whether the user is authentic based upon the liveness analysis and the anti-spoofing analysis; and
responsive to determining that the user is not authentic, rejecting registration of the user and the device.

6. The computer-implemented method of claim 1, wherein capturing the document information related to the user further comprises:
capturing an image of the document related to identification of the user;
determining whether the image of the document satisfies a threshold; and
responsive to determining that the image of the document does not satisfy the threshold, capturing another document image.

7. The computer-implemented method of claim 6, further comprising:
responsive determining that the image of the document satisfies the threshold, performing a document liveness check on the image of the document;
determining whether the document is authentic based upon the document liveness check; and
responsive to determining that the document is not authentic, rejecting registration of the user and the device.

8. The computer-implemented method of claim 1, further comprising:
detecting an image injection attack from the physical biometric information and the behavioral biometric information of the user;
detecting a device injection attack based on the device information of the user; and
responsive to detecting the image injection attack or the device injection attack, rejecting registration of the user and the device.

9. The computer-implemented method of claim 1, further comprising:
detecting a device risk based on the device information of the user; and
responsive to detecting the device risk, rejecting registration of the user and the device.

10. The computer-implemented method of claim 1, further comprising:
querying a third party data base using the document information to retrieve queried data;
comparing the queried data to the document information;
determining whether the queried data matches the document information within a predefined threshold; and
responsive to determining that the queried data does not match the document information within the predefined threshold, rejecting registration of the user and the device.

11. The computer-implemented method of claim 1, further comprising:
detecting a re-registration condition;
responsive to detecting re-registration, blocking any authorization approvals for the user;
performing a re-registration process;
determining whether an identity of the user is confirmed by the re-registration process; and
responsive to determining the identity of the user is confirmed, allowing an authorization approval.

12. The computer-implemented method of claim 1, wherein a re-registration condition includes one or more from a group of: a change in the physical biometric information, the behavioral biometric information, or the device information; an identity being compromised; a presence of biometric information on a dark web; and a request for re-registration.

13. A computer-implemented method comprising:
receiving, using one or more processors, device information for a device associated with a user;
receiving, using the one or more processors, physical biometric information of the user;
receiving, using the one or more processors, behavioral biometric information of the user;
performing, using the one or more processors, liveness analysis on the physical biometric information and the behavioral biometric information;
determining whether the user is authentic based upon the liveness analysis;
retrieving user information from an information assembly object;
comparing the user information to the physical biometric information;
determining whether the physical biometric information matches the user information from the information assembly object; and
responsive to the physical biometric information matching the user information, approving the user as authentic;
further comprising:
performing file system authentication using the device information;
determining whether the file system authentication satisfies a threshold; and
responsive to the file system authentication not satisfying the threshold, sending a notification to the device of the user to perform re-registration.

14. The computer-implemented method of claim 13, further comprising:
determining whether the physical biometric information satisfies a first quality threshold;
determining whether the behavioral biometric information satisfies a second quality threshold;
responsive to the physical biometric information not satisfying the first quality threshold, capturing additional biometric information; and
responsive to the behavioral biometric information not satisfying the second quality threshold, capturing additional behavioral information.

15. The computer-implemented method of claim 13, wherein the liveness analysis includes performing multimodal liveness analysis.

16. The computer-implemented method of claim 13, further comprising:
performing an anti-spoofing analysis on the physical biometric information and the behavioral biometric information;
determining whether the user is authentic based upon the liveness analysis and the anti-spoofing analysis; and responsive to determining that the user is not authentic, sending a notification to the device of the user to perform re-registration.

17. The computer-implemented method of claim 16, wherein the anti-spoofing analysis includes performing multi-modal anti-spoofing analysis.

18. The computer-implemented method of claim 13, further comprising:
   determining an expiration date of an identity document from the user information from the information assembly object;
   determining whether the identity document has expired; and
   sending a notification to the device of the user to perform re-registration.

19. The computer-implemented method of claim 13, further comprising:
   detecting a device risk based on the device information of the user; and
   responsive to detecting the device risk, sending a notification to the device of the user to perform re-registration.

20. A system comprising:
   a registry having an input and an output coupled to receive and send information, the registry configured to store information to identity assembly objects and retrieve information from the identity assembly objects;
   a registration module having an input and an output coupled to receive information from a computing device and store information to the registry, the registration module creating a unique identity assembly object associated with a user and a computing device pair, the registration module coupled to receive and process information from the computing device, the input and the output of the registration module coupled to the computing device to receive physical biometric information, behavioral biometric information, and device information and to send a registration signal, the output of the registration module coupled for storing information to the unique identity assembly object;
   an authentication module having an input and an output coupled to receive information from the computing device, the authentication module determining whether the user associated with the computing device is an authenticated user, the authentication module coupled to receive information from the computing device and sending an authentication signal to the computing device, the authentication module coupled to retrieve information from the registry for comparison to the information received from the computing device;
   a multi-modal biometric identifier configured to process information and extract two types of biometric information, the multi-modal biometric identifier coupled to receive information from the computing device and coupled to provide the biometric information to the registration module and the authentication module;
   a multi-modal liveness detector configured to detect liveness, the multi-modal liveness detector coupled to receive information from the computing device, the multi-modal liveness detector coupled to provide a determination of liveness to the registration module and the authentication module; and
   a multi-modal anti-spoofing detector configured to detect a plurality of types of spoofing, the multi-modal anti-spoofing detector coupled to receive information from the computing device, the multi-modal anti-spoofing detector configured to provide a determination regarding spoofing to the authentication module and the registration module;
   a file system authenticator configured to perform file system authentication using the device information;
   determining whether the file system authentication satisfies a threshold; and
   responsive to the file system authentication not satisfying the threshold, sending a notification to the device of the user to perform re-registration.

21. The system of claim 20, wherein each identity assembly object comprises:
   a first record storing physical biometric information;
   a second record storing behavioral biometric information; and
   a third record storing device information.

22. The system of claim 20, further comprising an identity assembly object generator coupled to the registry and the registration module, the identity assembly object generator configured to generate identity assembly objects responsive to requests from the registration module, the identity assembly object generator creating a and storing it in the registry.

23. The system of claim 20, wherein the multi-modal biometric identifier includes:
   a user attribute and behavior determiner configured to communicate with the computing device and generate physical biometric information and behavioral biometric information; and
   a device information determiner configured to communicate with the computing device and generate device information.

24. The system of claim 20, wherein the multi-modal liveness detector comprises a first liveness detector configured to detect a first type of liveness, and a second multi-modal liveness detector configured to detect a combined type of liveness for both a second and a third type of liveness, the multi-modal liveness detector coupled to provide a determination regarding the first type of liveness from the first liveness detector and a determination regarding the combined type of liveness to the registration module and the authentication module.

25. The system of claim 20, wherein the multi-modal anti-spoofing detector comprises a first anti-spoofing detector configured to detect a first type of spoofing, and a second multi-modal anti-spoofing detector configured to detect a combined type of spoofing for both a second and a third type of spoofing, the multi-modal anti-spoofing detector coupled to provide a determination regarding the first type of spoofing from the first anti-spoofing detector and a determination regarding the combined type of spoofing from the second anti-spoofing detector liveness to the registration module and the authentication module.

\* \* \* \* \*